United States Patent [19]

Matsuoka

[11] Patent Number: 5,074,113

[45] Date of Patent: Dec. 24, 1991

[54] AIR-FUEL RATIO CONTROL DEVICE OF AN INTERNAL COMBUSTION ENGINE

[75] Inventor: Hiroki Matsuoka, Susono, Japan

[73] Assignee: Toyota Jidosha Kabushiki Kaisha, Japan

[21] Appl. No.: 541,830

[22] Filed: Jun. 21, 1990

[30] Foreign Application Priority Data

Jun. 23, 1989 [JP] Japan .................................. 1-161592

[51] Int. Cl.⁵ ................................................ F01N 3/22
[52] U.S. Cl. .......................................... 60/276; 60/285
[58] Field of Search ........................... 60/276, 274, 285

[56] References Cited

U.S. PATENT DOCUMENTS

| | | | |
|---|---|---|---|
| 4,263,782 | 4/1981 | Matsumoto | 60/276 |
| 4,383,515 | 5/1983 | Higashiyama | 60/276 |
| 4,522,180 | 6/1985 | Matsuoka et al. | |
| 4,696,274 | 9/1987 | Sato | |

FOREIGN PATENT DOCUMENTS

| | | |
|---|---|---|
| 59-87241 | 5/1984 | Japan . |
| 59-87242 | 5/1984 | Japan . |
| 63-79448 | 5/1988 | Japan . |
| 63-79449 | 5/1988 | Japan . |
| 63-118354 | 7/1988 | Japan . |
| 63-119844 | 8/1988 | Japan . |
| 1-8332 | 1/1989 | Japan . |

Primary Examiner—Douglas Hart
Attorney, Agent, or Firm—Oliff & Berridge

[57] ABSTRACT

An air-fuel ratio control device comprising two main air-fuel ratio detecting sensors arranged in first and second exhaust passages upstream of three-way catalysts respectively for detecting an air-fuel ratio in the first and second exhaust passages, an auxiliary air-fuel ratio detecting sensor for detecting an air-fuel ratio in at least a first exhaust passage of the first and second exhaust passages downstream of the three-way catalysts, a deviation detecting unit for detecting a mutual deviation between the air-fuel ratios in the first and second exhaust passages, a first control value controlling unit for controlling a control value in at least the first cylinder bank to which the first exhaust passage is connected, on the basis of the value detected by the auxiliary air-fuel ratio detecting sensor, a second control value controlling unit for controlling a control value in at least the second cylinder bank on the basis of the deviation detected by the deviation detecting unit to cancel the deviation, a feedback correction coefficient controlling unit for controlling the feedback correction coefficients in the cylinder banks on the basis of the values detected by the corresponding main air-fuel ratio detecting sensors and the control values, and an air-fuel ratio control unit for controlling the air-fuel ratio in the first and second exhaust passages by the corresponding feedback correction coefficients to obtain a predetermined air-fuel ratio.

25 Claims, 22 Drawing Sheets

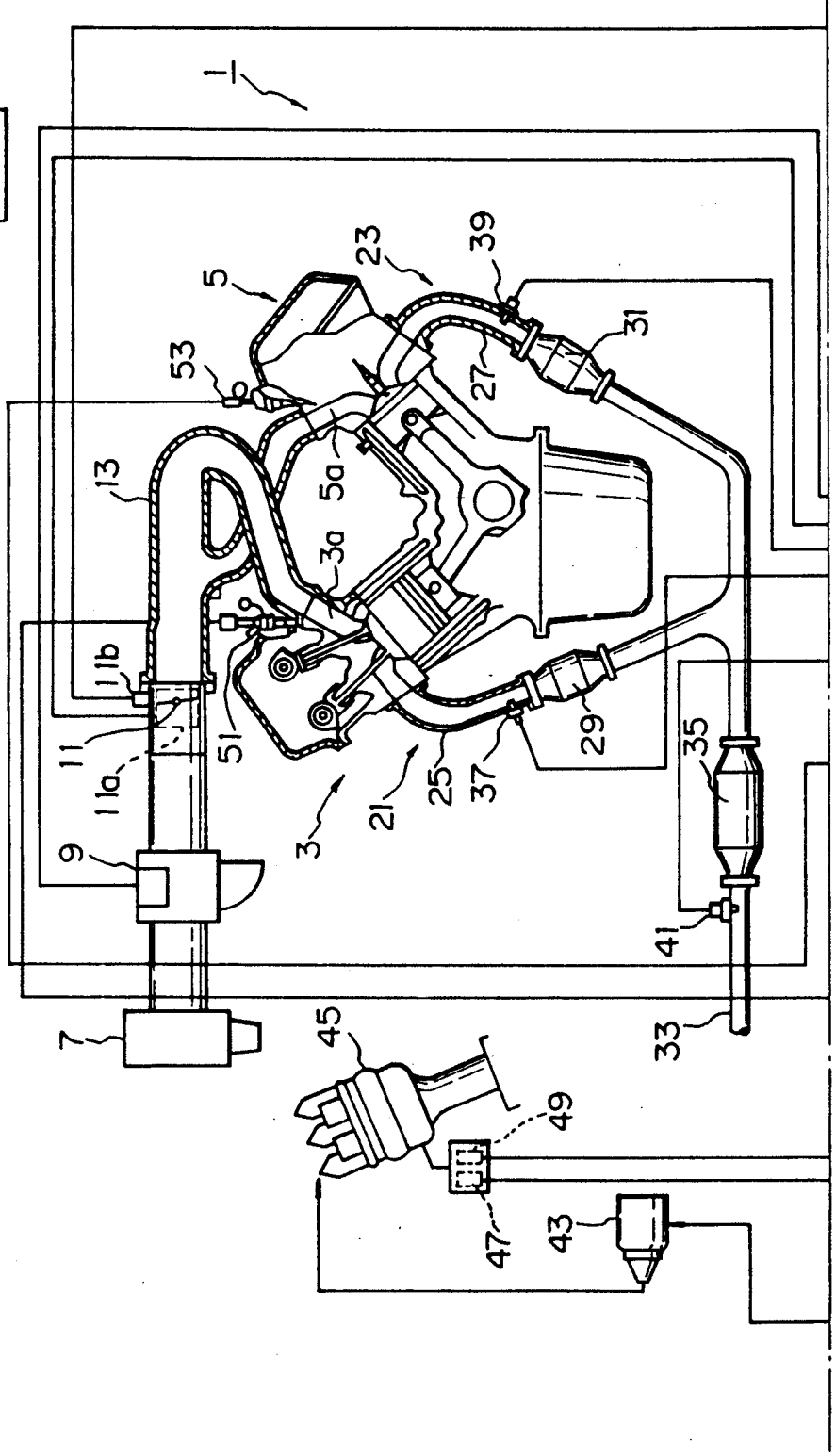

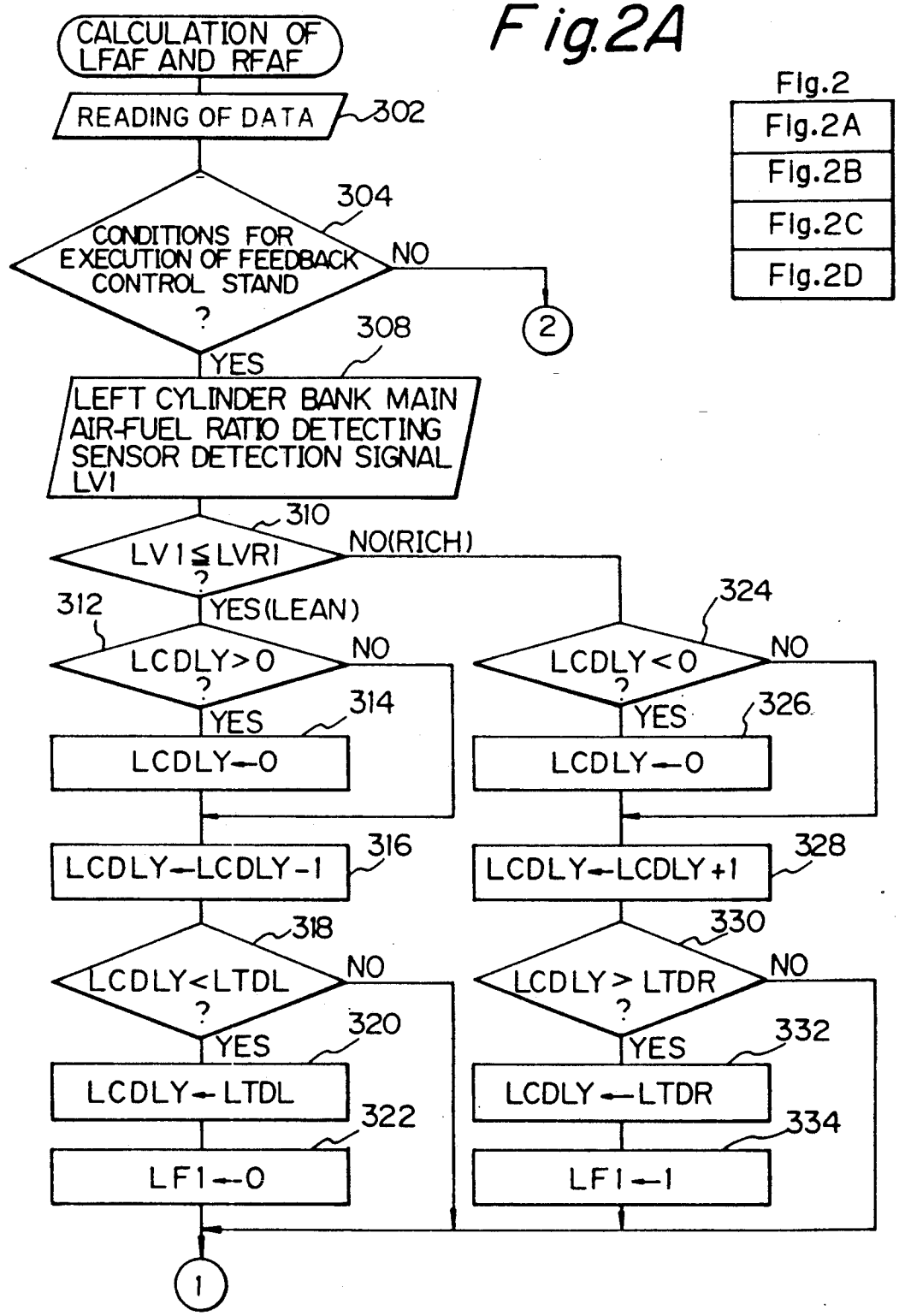

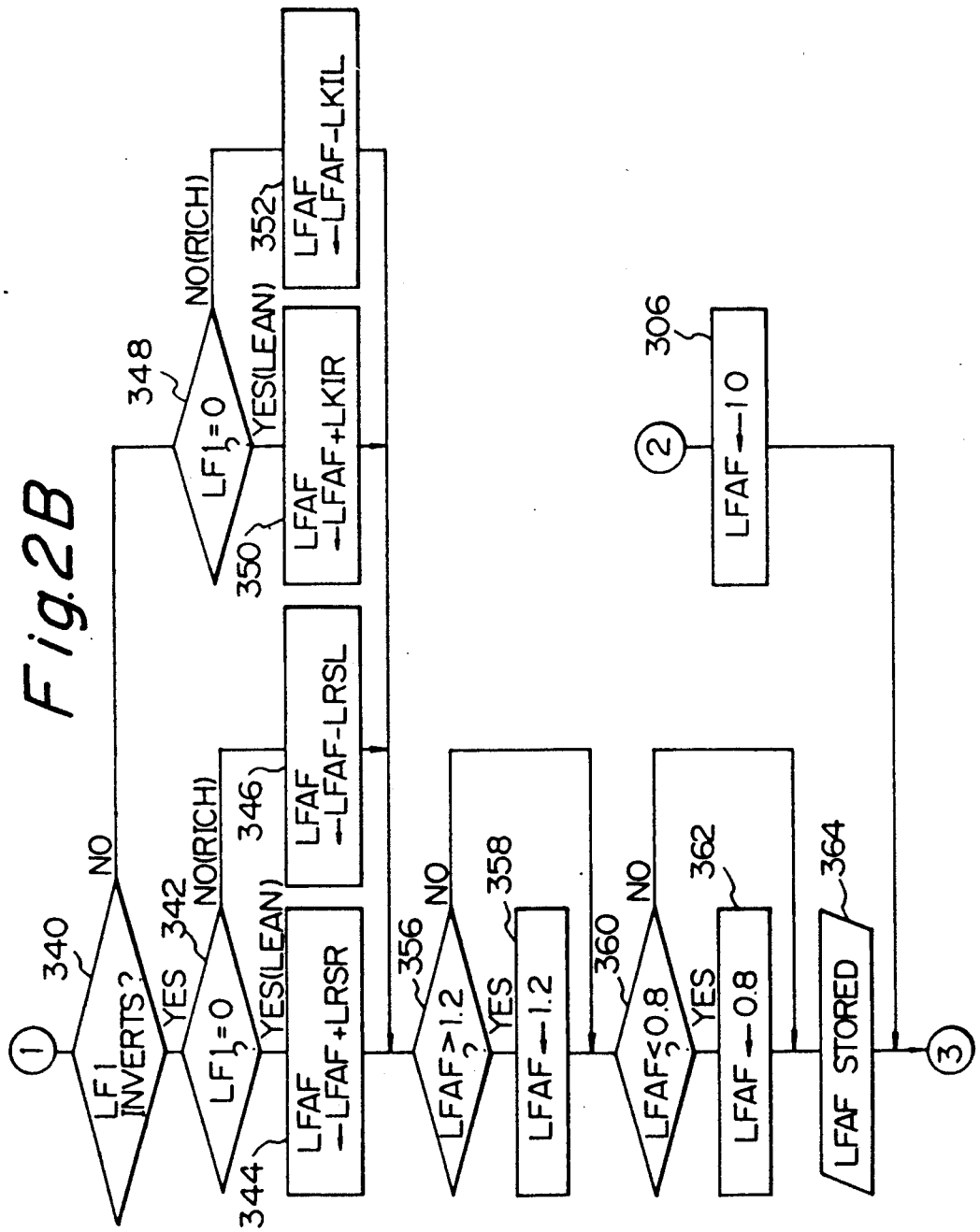

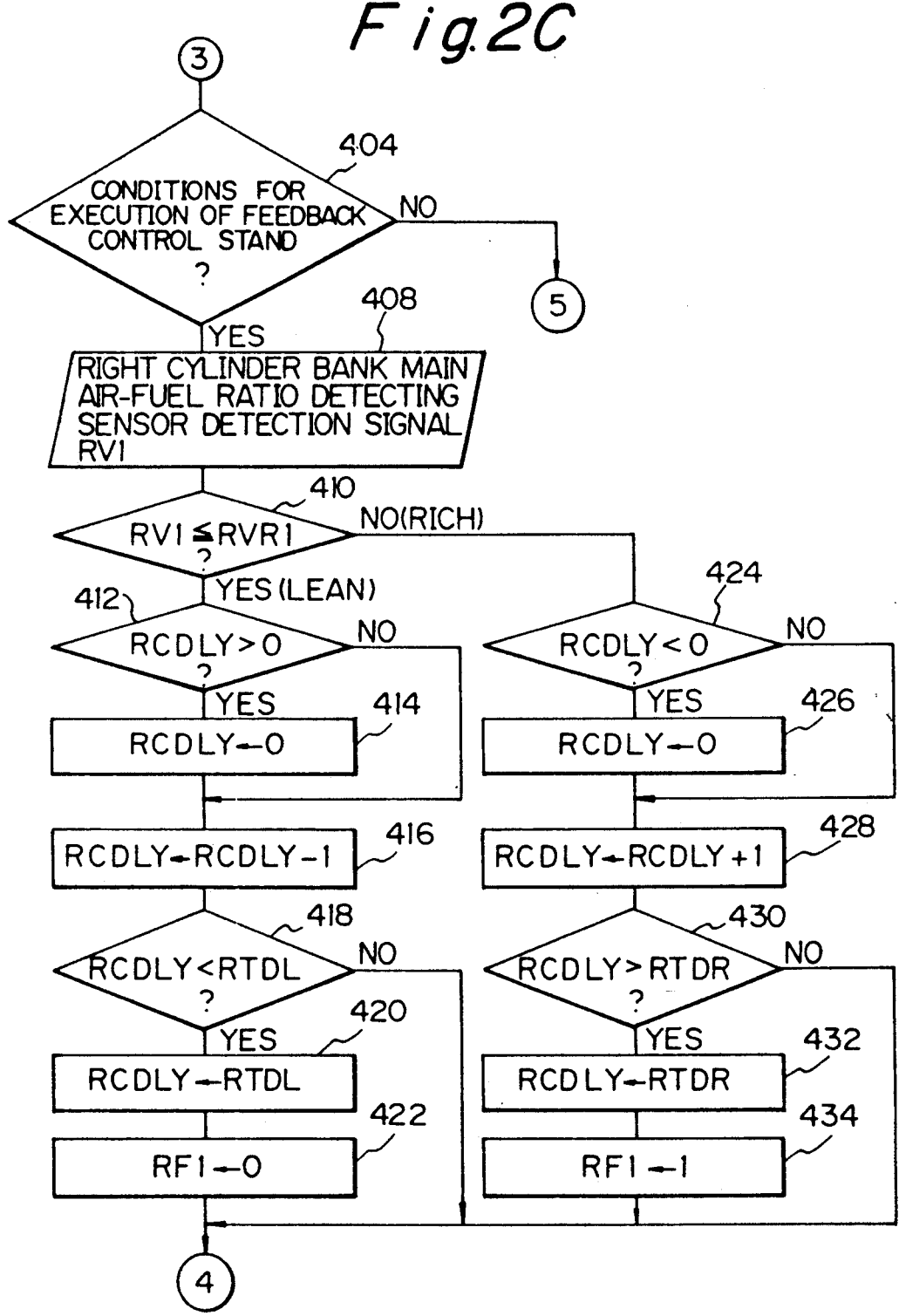

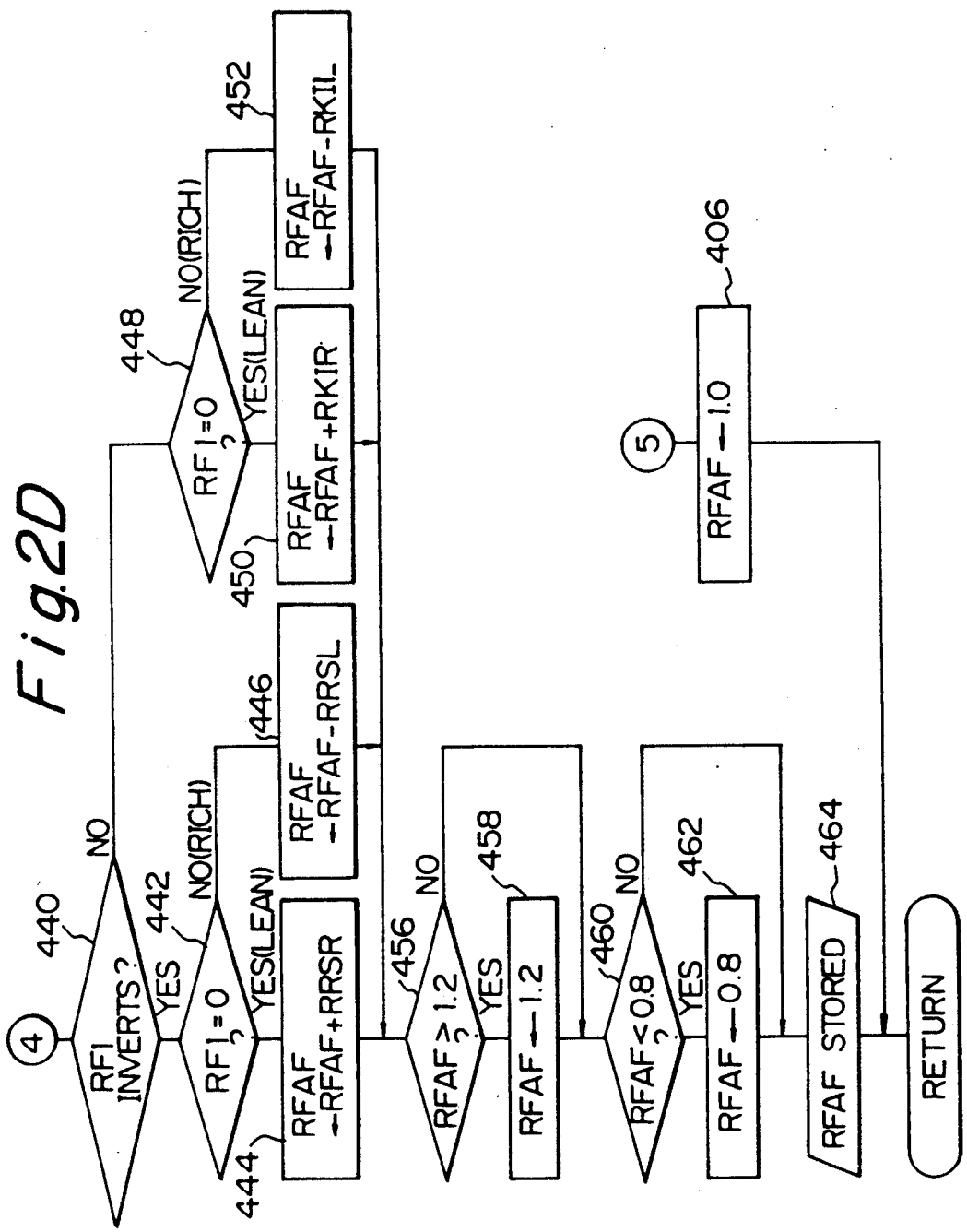

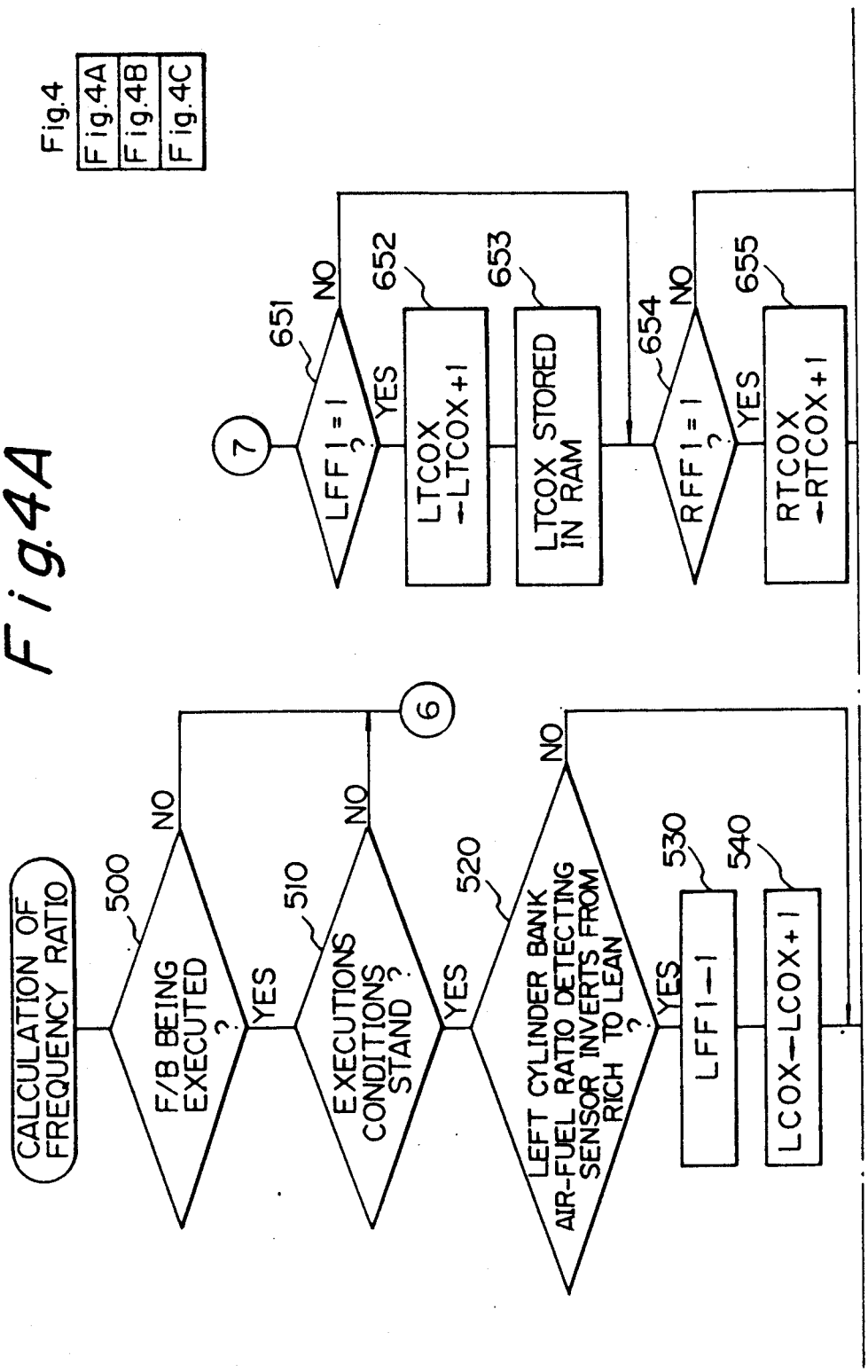

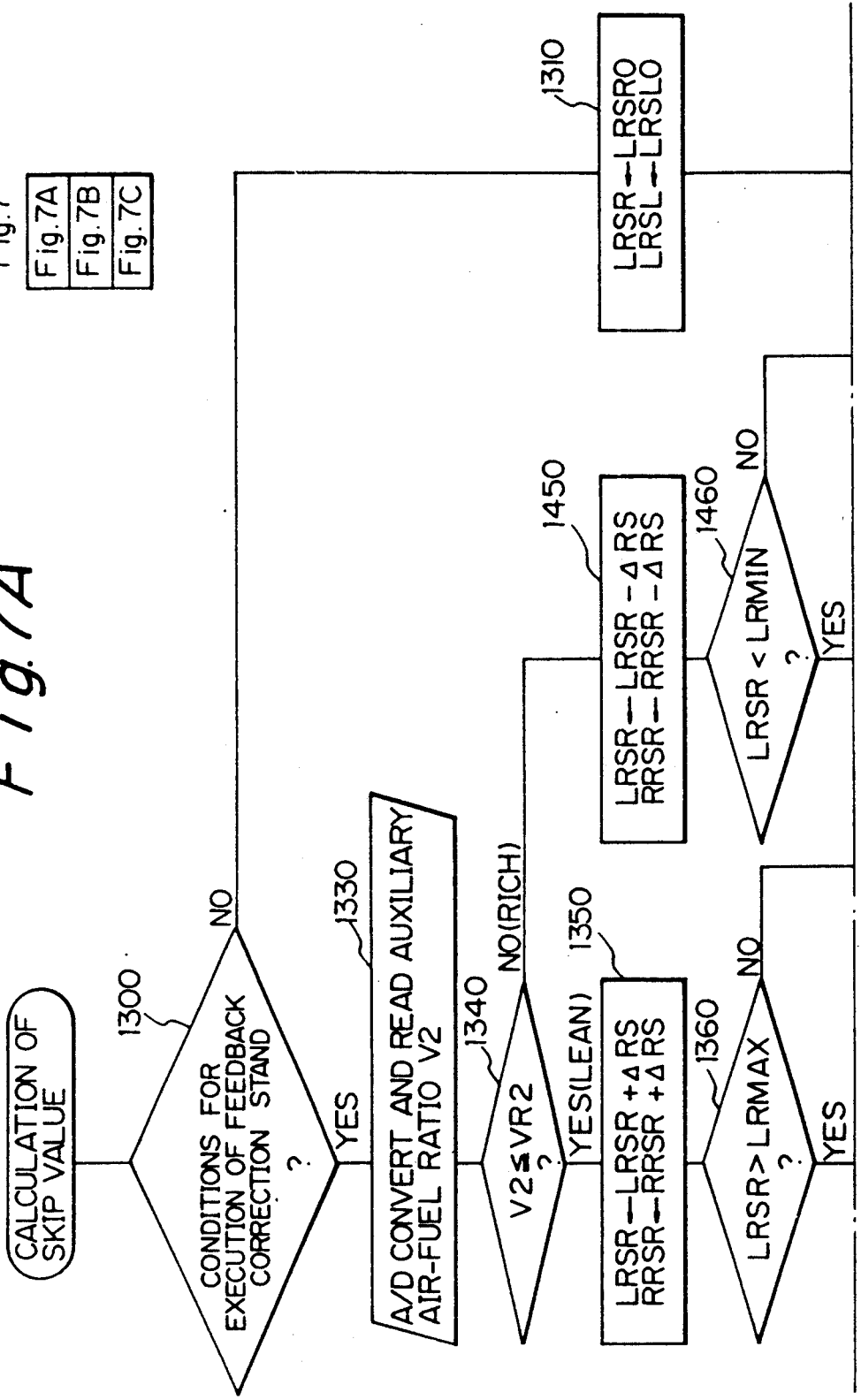

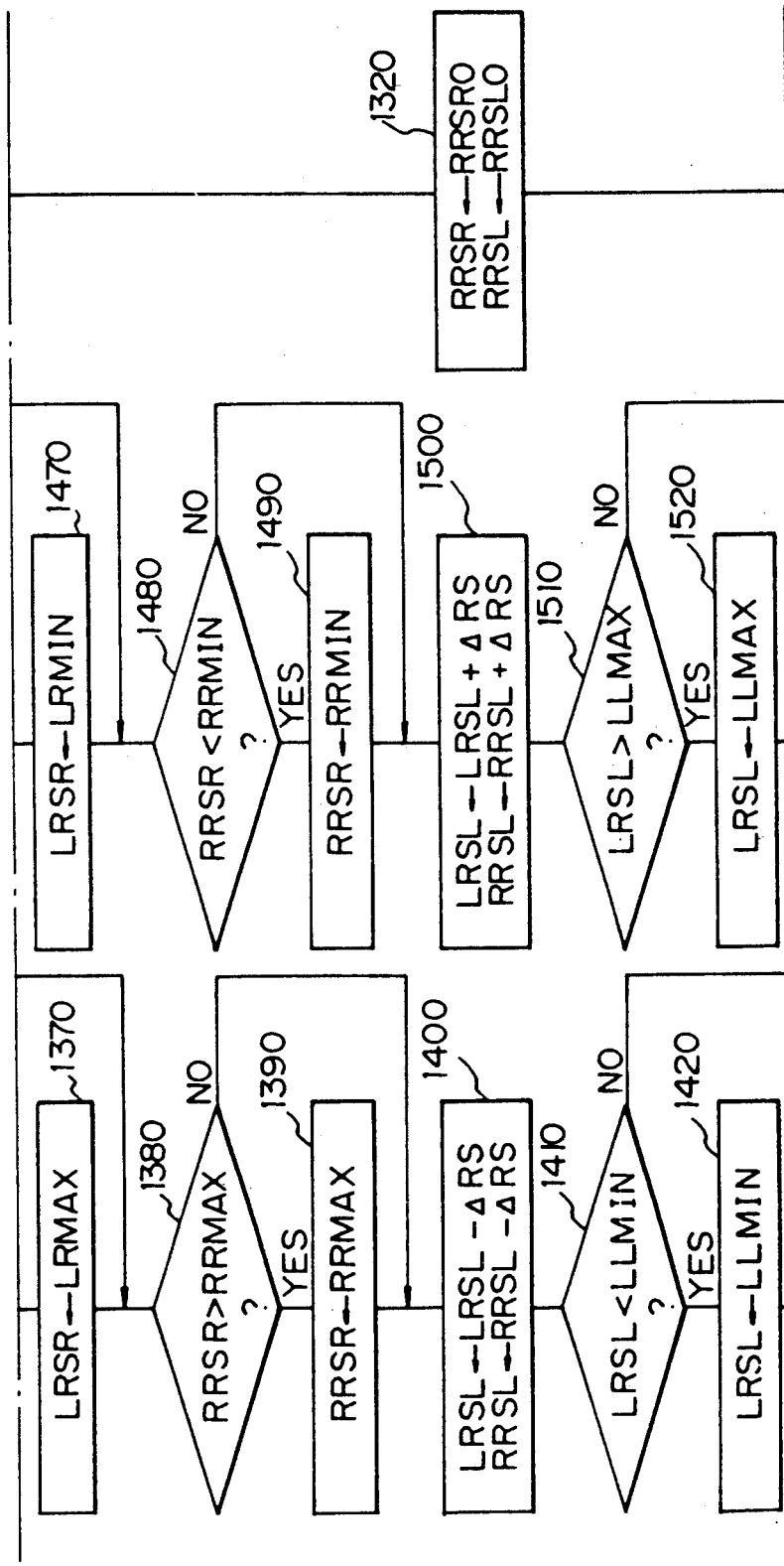

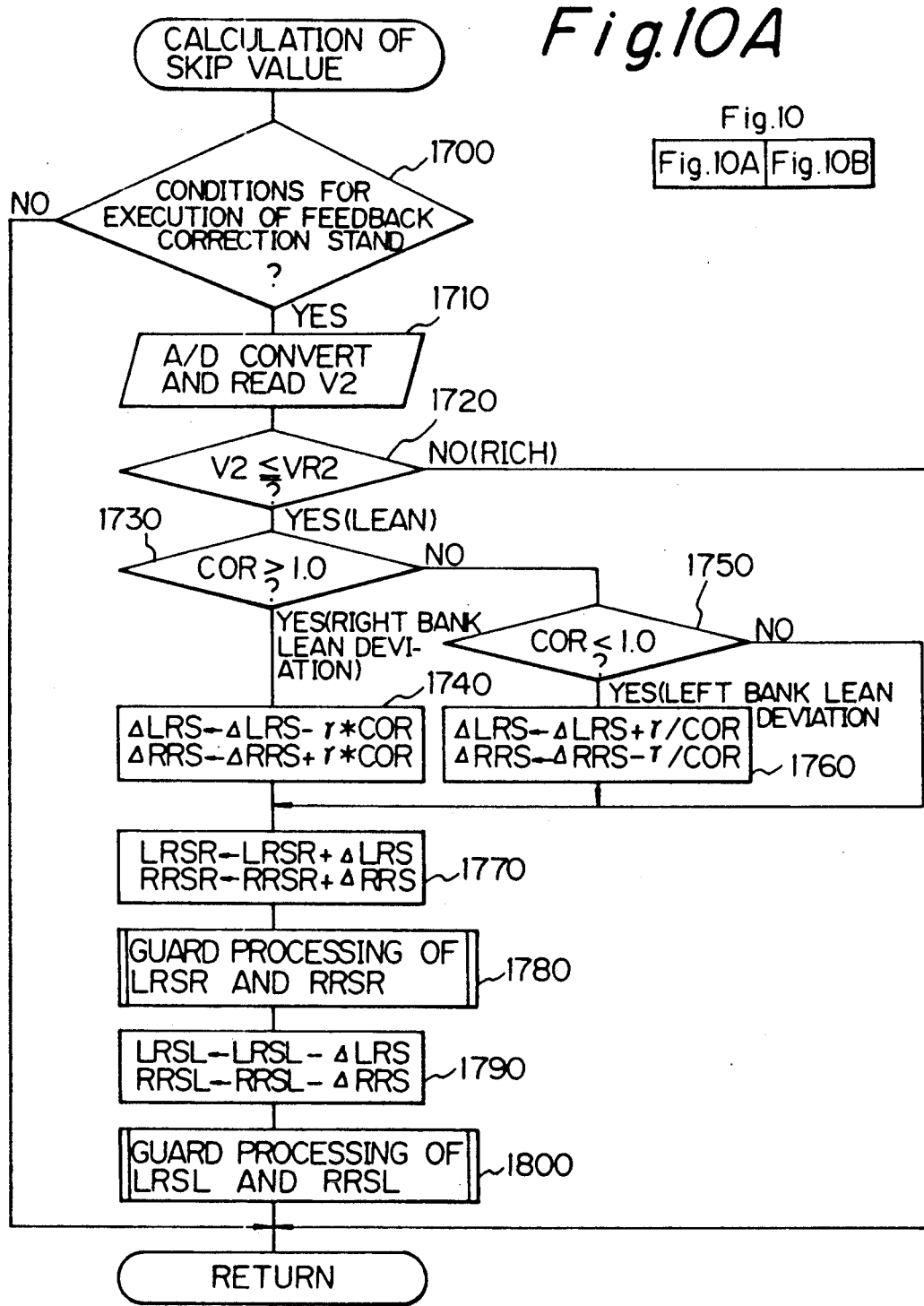

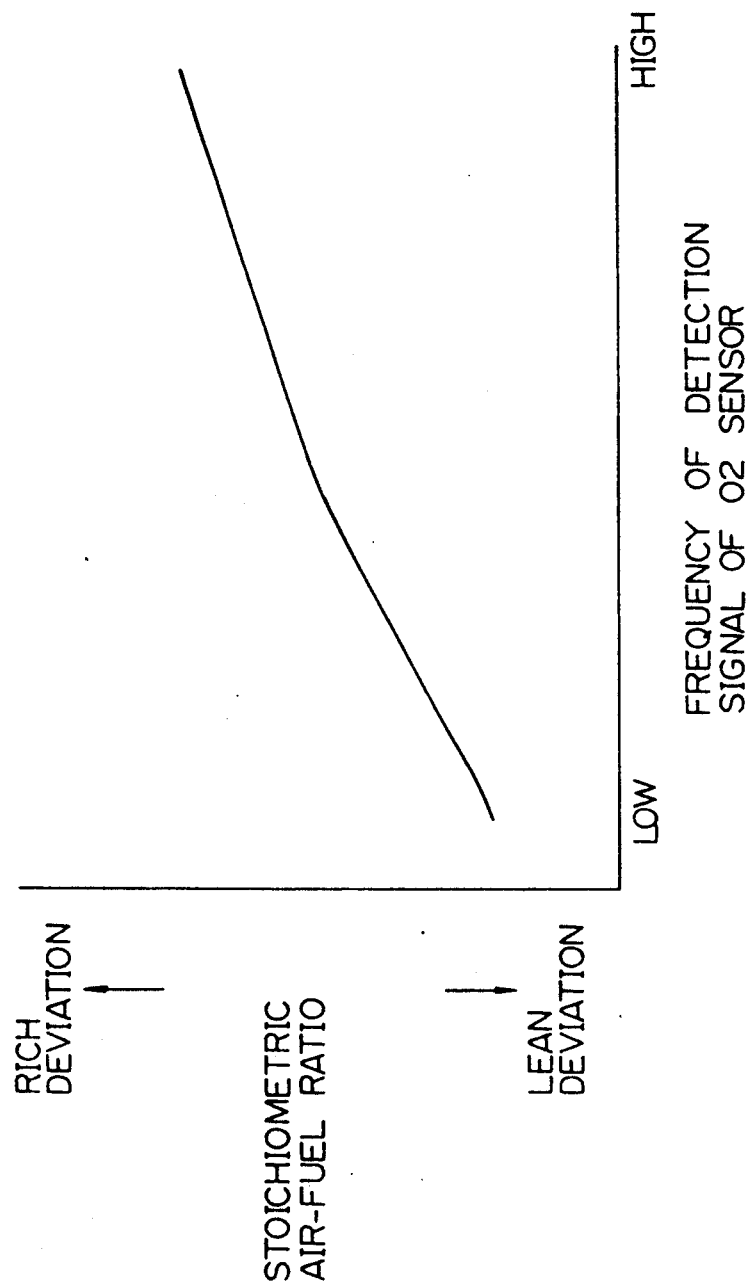

AIR-FUEL RATIO CONTROL DEVICE OF AN INTERNAL COMBUSTION ENGINE

BACKGROUND OF THE INVENTION

1. Field of the Invention

The present invention relates to an air-fuel ratio control device of an internal combustion engine.

2. Description of the Related Art

In an internal combustion engine for an automobile, an air-fuel ratio sensor is provided upstream of the three-way catalyst in the exhaust system for performing feedback control over the air-fuel ratio from the viewpoint of improving the cleaning efficiency of the three-way catalyst and improving the fuel efficiency. However, an air-fuel ratio sensor disposed upstream of the three-way catalyst is easily deteriorated due to the high temperatures there. Therefore, another air-fuel ratio sensor is provided downstream of the three-way catalyst for a so-called two sensor system, with the downstream sensor monitoring the control of the upstream sensor and correcting the same in accordance with the deterioration of the upstream sensor.

Even in a V type engine having two cylinder banks and two exhaust manifolds, use is made of two-sensor systems for the same purpose (see Japanese Utility Model Publication No. 63-79448, Japanese Unexamined Utility Model Publication No. 63-79449, and Japanese Unexamined Utility Model Publication No. 63-118354). In these systems, structurally, to eliminate one of the downstream air-fuel ratio sensors, the two exhaust passages are made to converge and a single auxiliary air-fuel ratio sensor is used for monitoring the feedback control of the air-fuel ratios of the cylinder banks performed by the two upstream main air-fuel ratio detecting sensors.

That is, the control system provided there, first, uses two main air-fuel ratio detecting sensors for performing feedback control over the air-fuel ratios of the cylinder banks independently so as to suitably adjust the exhaust and, second, uses a single auxiliary air-fuel ratio sensor for detecting the air-fuel ratio of the mixed exhaust of the two cylinder banks so as to correct the feedback control by the main air-fuel ratio detecting sensors from the detected value. For example, it may correct the air-fuel ratio by correcting the control values, i.e., the skip amount or the integration constant.

By this, even if the upstream main air-fuel ratio detecting sensors deteriorate and deviate in characteristics, this can be compensated for by the downstream auxiliary air-fuel ratio detecting sensor so as to ensure control to the target air-fuel ratio.

However, the downstream auxiliary air-fuel ratio detecting sensor is controlling the mixed exhaust to the target air-fuel ratio. Therefore, when the air-fuel ratio of the exhaust of one cylinder bank deviates in a reverse direction from the air-fuel ratio of the exhaust of the other cylinder bank, the deviations from the target air-fuel ratio of the air-fuel ratios of the two cylinder banks will cancel each other out and it will sometimes be judged that the air-fuel ratio of the mixed exhaust is the target air-fuel ratio.

When this situation arises, it becomes impossible for the air-fuel ratios of the cylinder banks to be restored to their normal states by the downstream auxiliary air-fuel ratio detecting sensor. Therefore, the air-fuel ratio continues deviated from the target air-fuel ratio and the cleaning performance of the catalyst quickly declines, resulting in the problems of a deteriorated fuel efficiency and emission.

SUMMARY OF THE INVENTION

An object of the present invention is to provide an air-fuel ratio control device capable of controlling to the target air-fuel ratio the air-fuel ratios of the exhausts in the exhaust passages connected to the cylinder banks.

According to the present invention, there is provided an air-fuel ratio control device of an internal combustion engine having first and second cylinder banks, first and second exhaust passages connected to the first and second cylinder banks respectively, and first and second three-way catalysts disposed in the first and second exhaust passages respectively, the device comprising: two main air-fuel ratio detecting sensors arranged in the first and second exhaust passages upstream of the three-way catalysts respectively for detecting an air-fuel ratio in the first and second exhaust passages; an auxiliary an air-fuel ratio detecting sensor for detecting an air-fuel ratio in at least first exhaust passage of the first and second exhaust passages downstream of the three-way catalysts; deviation detecting means for detecting a mutual deviation between the air-fuel ratios in the first and second exhaust passages; first control value controlling means for controlling a control value in at least the first cylinder bank to which the first exhaust passage is connected on the basis of the value detected by the auxiliary air-fuel ratio detecting sensor; second control value controlling means for controlling a control value in at least the second cylinder bank on the basis of the deviation detected by the deviation detecting means to cancel the deviation; feedback correction coefficient controlling means for controlling the feedback correction coefficients in the cylinder banks on the basis of the values detected by the corresponding main air-fuel ratio detecting sensors and said control values; and air-fuel ratio control means for controlling the air-fuel ratio in the first and second exhaust passages by the corresponding feedback correction coefficients to become a predetermined air-fuel ratio.

The present invention may be more fully understood from the description of preferred embodiments of the invention set forth below together with the accompanying drawings.

BRIEF DESCRIPTION OF THE DRAWINGS

In the drawings,

FIG. 2 (FIGS. 2A, 2B, 2C and 2D) is a flow chart of the control of the feedback correction coefficient;

FIG. 12 is a graph of the relationship between the frequency of the output signal of the air-fuel ratio detecting sensor and the air-fuel ratio.

DESCRIPTION OF THE PREFERRED EMBODIMENTS

Figure 1B:
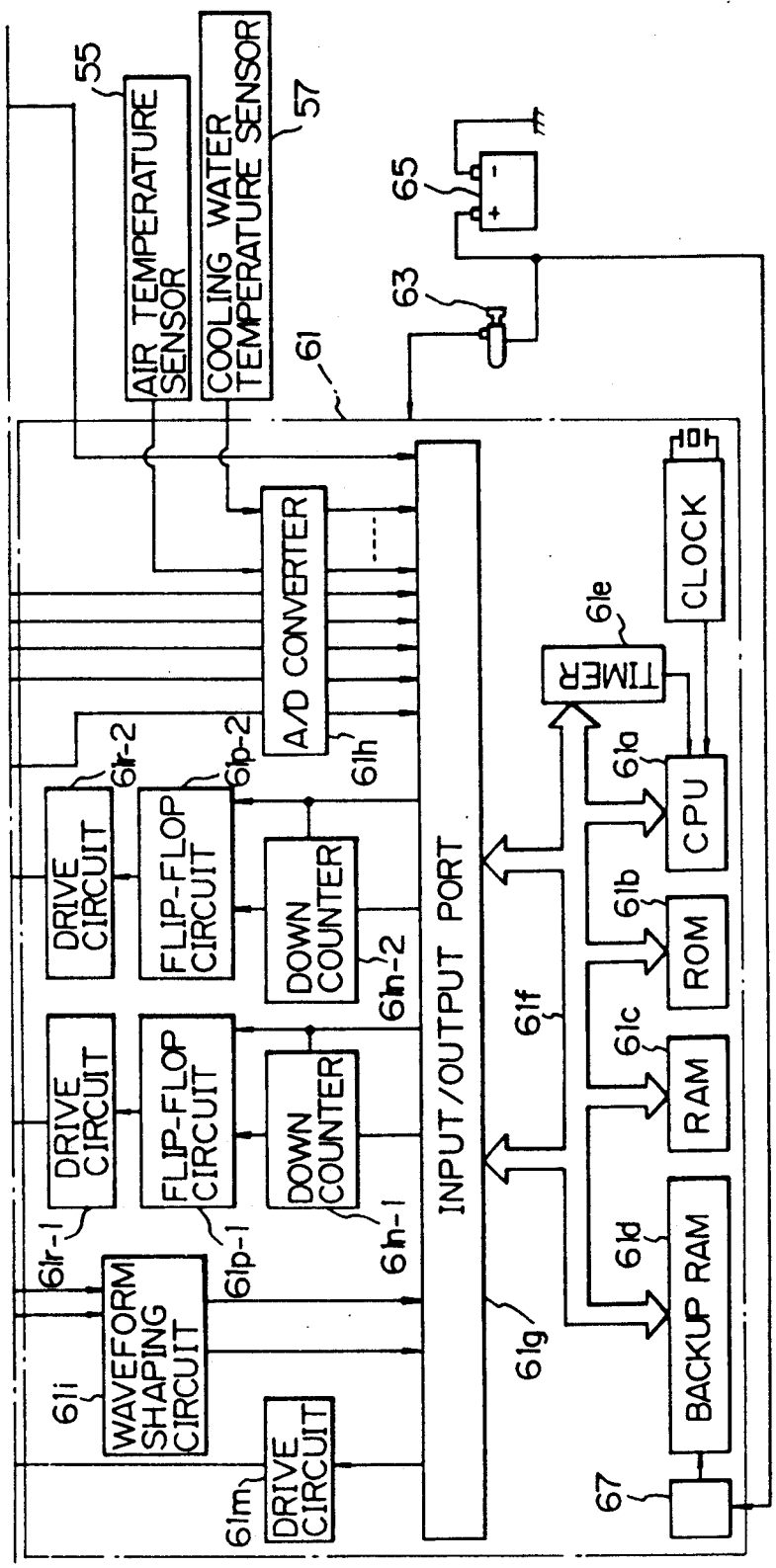
FIG. 1 (FIGS. 1A and 1B) is an overall view of a V type 8-cylinder gasoline engine.

FIG. 1 shows a V type 8 cylinder gasoline engine. Referring to FIG. 1, the left cylinder bank 3 and right cylinder bank 5 each have four cylinders. The intake system of the engine 1 is provided with an air cleaner 7, an air flow meter 9, a throttle valve 11 connected to an accelerator pedal, a throttle position sensor 11a for detecting the degree of opening of the throttle valve 11, an idle switch 11b for detecting the fully closed state of the throttle valve 11, and an intake manifold for dividing the intake among the cylinders.

The exhaust system of the engine 1 is provided with respect to both of the cylinder banks 3 and 5 and is split into exhaust systems 21 and 23. Each of the two exhaust systems 21 and 23 have an exhaust manifold 25, 27 and a first catalytic converter 29, 31 filled with a three-way catalyst.

The two exhaust systems 21, 23 are converged at a convergence pipe 33 downstream of the first catalytic converters 29, 31. At the convergence pipe 33 is provided a second catalytic converter 35 filled with a three-way catalyst. The second catalytic converter 35 receives equal inflows of exhaust from the two left and right cylinder banks 3 and 5.

In the exhaust systems 21 and 23, main air-fuel ratio detecting sensor 37 and 39 are provided upstream of the first catalytic converters 29 and 31. Further, an auxiliary air-fuel ratio detecting sensor 41 is provided downstream of the second catalytic converter 35 in the convergence pipe 33. The three air-fuel ratio detecting sensors 37, 39, and 41 are general oxygen concentration sensors provided with functions for detecting the oxygen concentration in the exhaust.

The ignition system of the engine 1 is provided with an ignitor 43 provided with an ignition coil which outputs the high voltage required for ignition and a distributor 45 which distributes the high voltage generated by the ignitor 43 to the spark plugs. The distributor 45 is provided with a cylinder discrimination sensor 47 which outputs a reference signal with each revolution of a camshaft (not shown), that is, with each two revolutions of a crankshaft (not shown), and a crank angle sensor 49, which also serves as a rotational speed sensor, which outputs a rotational angle signal with each 1/24th revolution of the camshaft, i.e., with each 30 degrees of the crank angle.

In each cylinder there are provided solenoid type fuel injection valves 51 and 53 for injecting fuel sent under pressure from a fuel pump (not shown) near the intake ports 3a and 5a of the cylinders.

The engine 1 is further provided with an air temperature sensor 55 for measuring the temperature of the intake air and a cooling water temperature sensor 57 for detecting the temperature of the cooling water of the engine 1.

The detection signals of the sensors are input to a control circuit 61. This control circuit 61 controls the operating state of the engine 1 by adjusting the timing of valve opening and the valve opening time of the left and right fuel injection valves 51 and 53 and the timing of the output of the high voltage of the ignitor 43.

The control circuit 61 is provided with a CPU 61a, ROM 61b, RAM 61c, backup RAM 61d, timer 61e, and input and output port 61g, which are connected with each other through a common bus 61f. The detection signals of the air-fuel ratio detecting sensors 37, 39, and 41, the air flow meter 9, the throttle position sensor 11a, the air temperature sensor 55, and the water temperature sensor 57 are input to the input-output port 61g through an A/D converter 61h, while the detection signal of the idle switch 11b is input directly to the input-output port 61g and the detection signal of the crank angle sensor 49 is input to the input-output port 61g through a waveform shaping circuit 61i.

On the other hand, the CPU 61a drives and controls the ignitor 43 through the input-output port 61g and a drive circuit 61m. Further, the CPU 61a drives and controls the fuel injection valve 51 on the side of the left cylinder bank 3 through the input-output port 61g, down counter 61n-1, flip-flop circuit 61p-1, and drive circuit 61r-1. Further, the CPU 61a drives and controls the fuel injection valve 53 of the right cylinder bank 5 through the input-output port 61g, down counter 61n-2, flip-flop circuit 61p-2, and drive circuit 61r-2. That is, the values corresponding to the fuel injection amounts LTAU and RTAU of the fuel injection valves 51 and 53 calculated by the CPU 61a are preset in the down counters 61n-1 and 61n-2. Further, the flip-flop circuits 61p-1 and 61p-2 are set. Therefore, the drive circuits 61r-1 and 61r-2 open the fuel injection valves 51 and 53 and start the fuel injections. On the other hand, the down counters 61n-1 and 61n-2 count the clock signals and, when the carry out terminal finally becomes a high level (1), the flip-flop circuits 61p-1 and 61p-2 are set, the drive circuits 61r-1 and 61r-2 close the fuel injection valves 51 and 53, and the fuel injection is ended. In this way, fuel is supplied to the cylinder banks 3 and 5 in accordance with the fuel injection amounts LTAU and RTAU calculated by independent feedback control processing for each cylinder bank 3 and 5.

Note that the control circuit 61 operates under the supply of power from a car battery 65 through an ignition switch 63. Further, the backup RAM 61d is not powered through the ignition switch 63, but is directly powered from the car battery 65 through the power circuit 67, so the content of the memory is maintained irregardless of the state of the ignition switch 63.

Next, an explanation will be made of the control processing performed by the control circuit 61.

The first part of the control processing is the general air-fuel ratio feedback control processing performed for each cylinder bank (FIGS. 2A, 2B, 2C, and 2D and FIG. 8).

That is, based on the intake air signal from the air flow meter 9 and the rotational speed signal from the crank angle sensor 49, the basic fuel injection amount TAUO is calculated in the known mode. Based on the signals from the main air-fuel ratio detecting sensors 37 and 39 and, as needed other engine operating conditions, the basic fuel injection amount TAUO is corrected for each of the left and right cylinder banks 3 and 5. Based on this, the fuel injection amounts LTAU and RTAU are determined for the left and right cylinder banks 3 and 5 and the fuel injection valves 51 and 53 are driven.

Figure 4B:
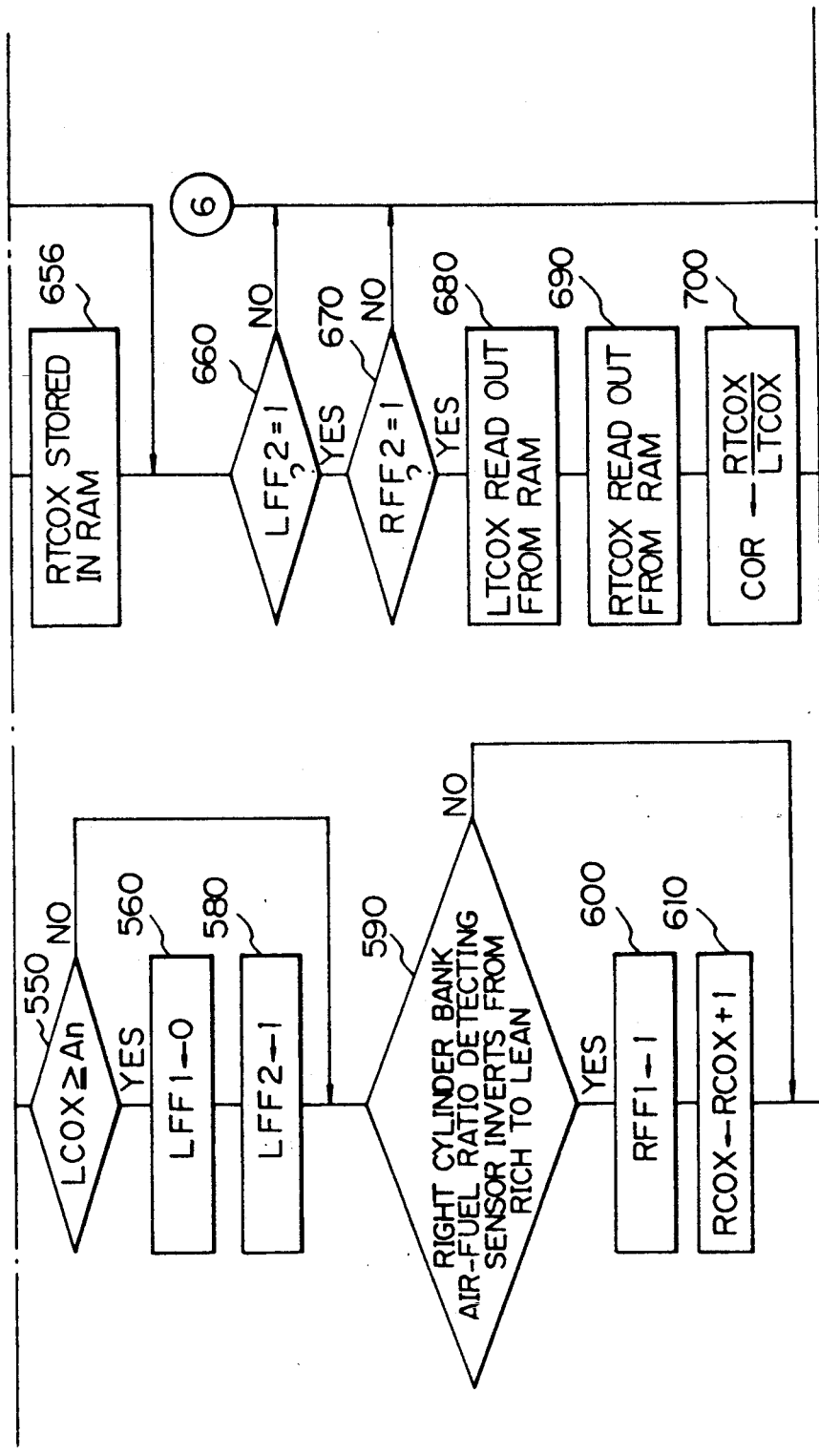
FIG. 4 (FIGS. 4A, 4B and 4C) is a flow chart of the calculation of the frequency ratio.
Figure 4C:
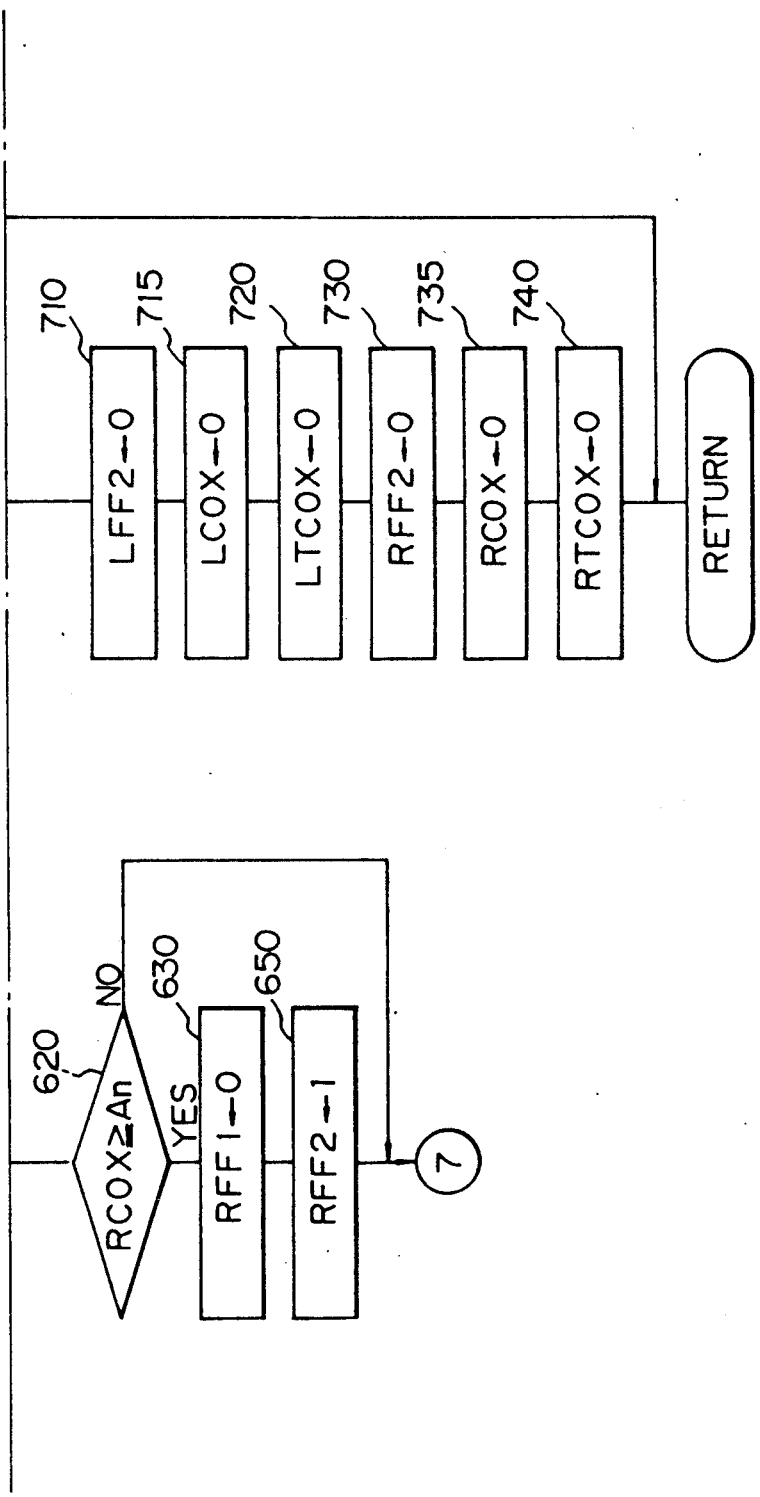
Figure 6A:
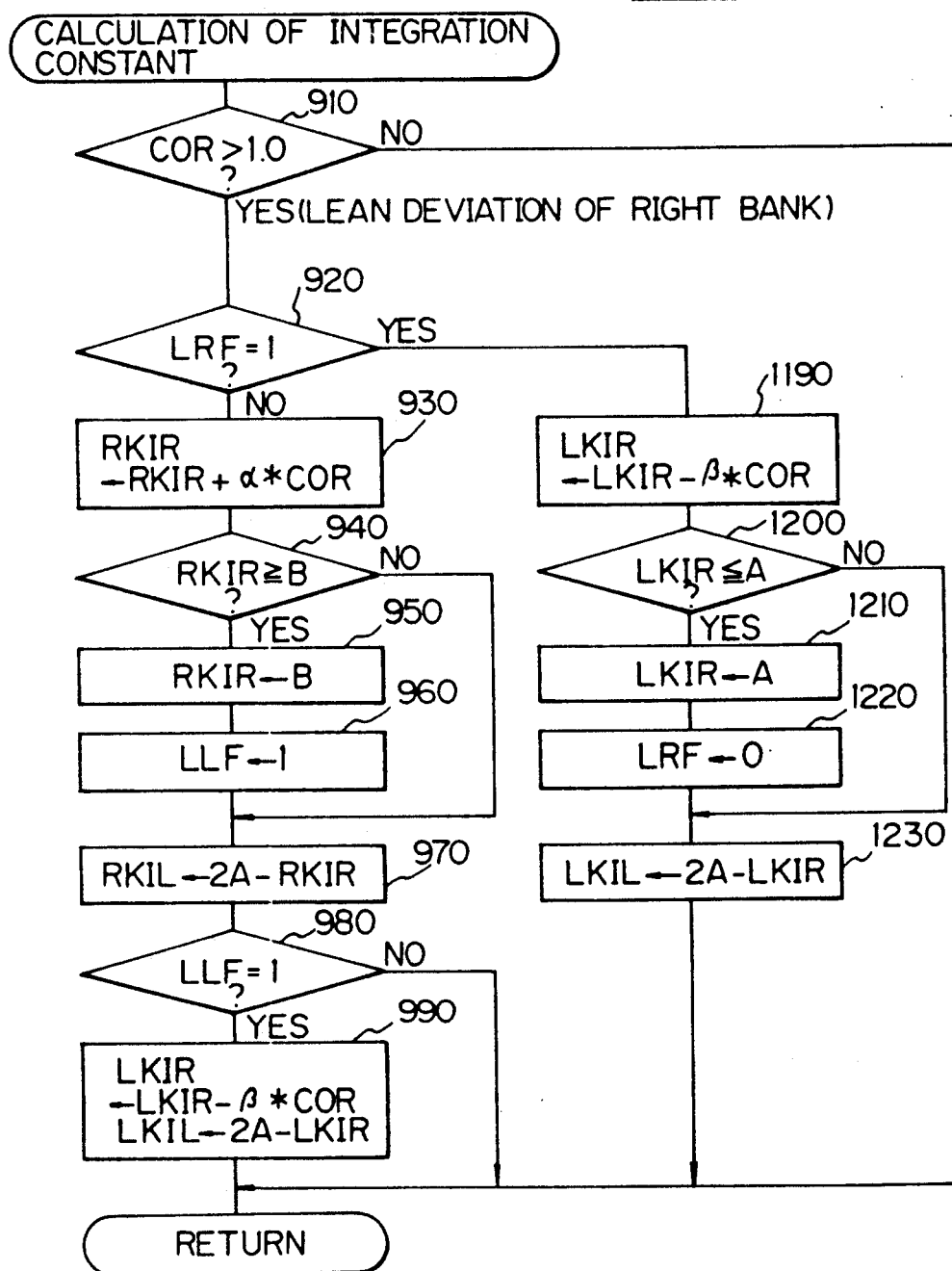
FIG. 6 (FIGS. 6A and 6B) is a flow chart of the control of the integration constant by the frequency ratio.
Figure 6B:
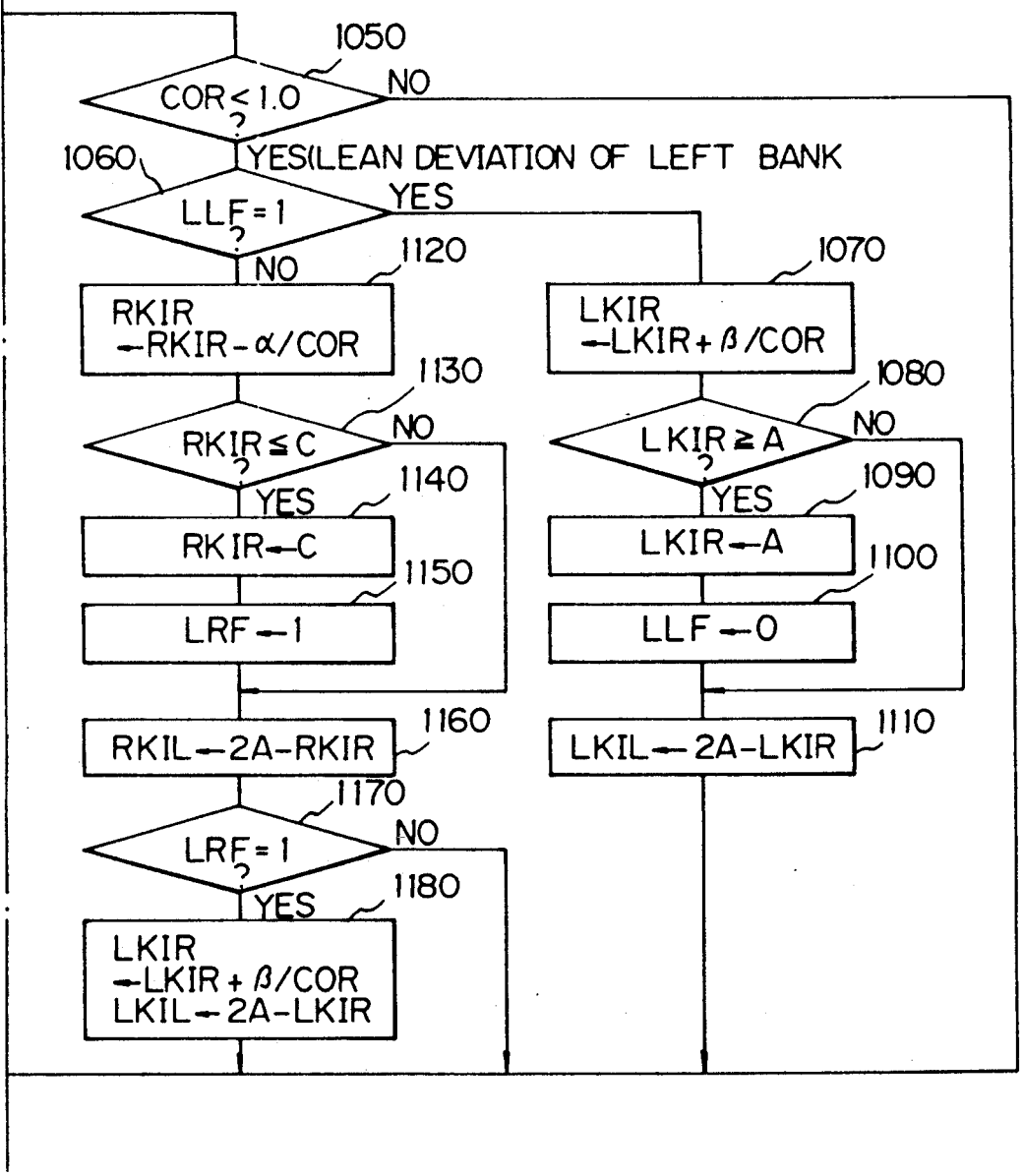

The second part of the control processing performed by the control circuit 61 is for comparing the states of the air-fuel ratios in the cylinder banks 3 and 5, detecting the relative control deviations of the air-fuel ratios in the left and right cylinder banks 3 and 5, and performing control so as to eliminate the deviations (FIG. 4 and FIG. 6).

That is, the control circuit 61 catches the states of the air-fuel ratios at the two cylinder banks 3 and 5, for example, catches the output frequencies of the main air-fuel ratio detecting sensors 37 and 39 or the frequencies of the feedback correction coefficients LFAF and RFAF equal to these frequencies, and adjusts the control values of the feedback control in the cylinder banks 3 and 5, here being the amount of change of the LFAF and RFAF (that is, the integration constants LKIR, LKIL, RKIR, and RKIL), so that these frequencies match each other.

As shown in FIG. 12, the higher the frequency, the more the air-fuel ratio deviates to the rich side from the predetermined air-fuel ratio and the lower the frequency, the more it deviates to the lean side. This has been found experimentally. Therefore, by adjusting the control values based on the frequencies, it is possible to control the mutual deviation of the air-fuel ratios.

Figure 7C:
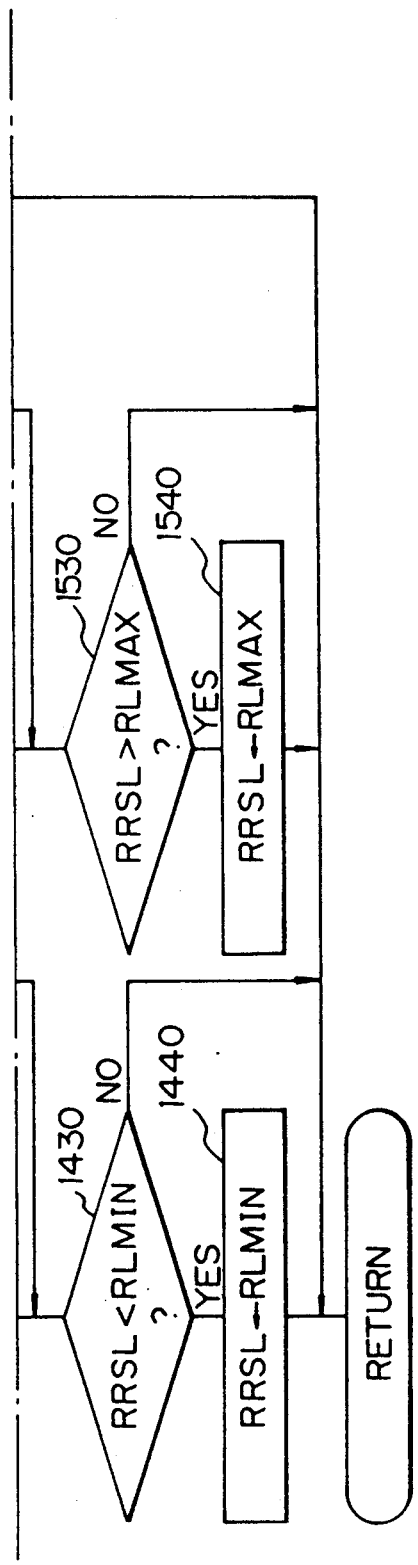
FIG. 7 (FIGS. 7A, 7B and 7C) is a flow chart of the control of the skip value by the detection signal of the auxiliary air-fuel ratio detecting sensor.

The third part of the control processing performed by the control circuit 61 is the control for correction of the mean change of characteristic of the main air-fuel ratio detecting sensors 37 and 39 due to changes over time or heat degradation based on the signals from the auxiliary air-fuel ratio detecting sensor 41 (FIG. 7).

That is, the mean air-fuel ratio of the left and right cylinder banks 3 and 5 detected by the auxiliary air-fuel ratio detecting sensor 41 provided in the portion where the exhausts of the left and right cylinder banks 3 and 5 converge made to approach the target air-fuel ratio, for example the stoichiometric air fuel ratio, by adjusting the control values of the feedback control in the cylinder banks 3 and 5, these being here the skip amounts LRSR, LRSL, RRSR, and RRSL at time of inversion of the LFAF and RFAF.

Next, an explanation will be made of the general air-fuel ratio feedback control processing performed for each cylinder bank in the control of the air-fuel ratio performed by the control circuit 61 using the flow chart of FIG. 2A to FIG. 2D.

The control processing is repeated executed at predetermined times (for example, 4 msec) after the startup of the control circuit 61. First, at step 302, processing is performed for reading the data based on the detection signals of the sensors.

Next, at steps 304 to 364, feedback control processing is performed for the air-fuel ratio of the left cylinder bank 3 and, at steps 404 to 464, feedback control processing is performed for the air-fuel ratio of the right cylinder bank 5.

First, at step 304, it is judged if the conditions for execution of feedback control of the air-fuel ratio of the left cylinder bank 3 stand. If yes, the processing proceeds to step 308, while if no, it proceeds to step 306, where the feedback correction coefficient LFAF is set to 1.0, then the feedback control processing of the left cylinder bank 3 is ended once and the control moved on to the processing of step 404.

Cases where the conditions for execution of the feedback control for the air-fuel ratio do not stand mean, for example, when the cooling water temperature THW is lower than a predetermined temperature (for example, 60° C.), times of engine starting, times of increase of fuel after engine starting, times of increase of fuel during engine warmup, times of increase of fuel during acceleration (asynchronous fuel injection), times of increase of fuel during high loads, and times when the output signal LV1 of the main air-fuel ratio detecting sensor 37 does not cross the first comparative voltage LVR1 even once. Note that in the processing of step 306, instead of the value of the feedback correction coefficient LFAF being set to 1.0, it is possible to also set it to a mean value of the values up to the end of the previous control, a learning value stored in the backup RAM 61d, and a predetermined initial value.

When none of the above conditions apply, i.e., when the conditions for execution of feedback control of the air-fuel ratio stand, the control proceeds to step 308, where processing is performed for A/D conversion of the detection signal LV1 of the main air-fuel ratio detecting sensor 37 of the left cylinder bank 3 and for reading the same. Next, at step 310, it is judged if the detection signal LV1 of the main air-fuel ratio detecting sensor 37 is less than a first comparative voltage LVR1 (for example, 0.45V). If yes, the air-fuel ratio is considered to be lean and the control proceeds to step 312, while if no, the air-fuel ratio is considered to be rich and the control proceeds to step 324. In step 312, executed when the air-fuel ratio is lean, it is judged if the count of a delay counter LCDLY is positive or not. If positive, at step 314, the count of the delay counter LCDLY is reset to 0 and then the control proceeds to step 316. On the other hand, when not positive, the control proceeds to step 316 as is. At step 316, the count of the delay counter LCDLY is decremented, then in the processing of the following steps 318 and 320, a restriction is applied so that the count of the delay counter LCDLY does not become less than the minimum LTDL. When the value of the delay counter LCDLY falls to the minimum value LTDL, the air-fuel ratio flag LF1 is reset to 0 (lean) at step 322, then the control proceeds to step 340. Note that the minimum value LTDL corresponds to the lean delay time for maintaining the judgement of being rich for a while even when the detection signal LV1 of the main air-fuel ratio detecting sensor 37 changes from rich to lean and is defined as a negative value.

On the other hand, at step 324, which is executed when it is judged at the above-mentioned step 310 that the air-fuel ratio is rich, it is judged if the count of the delay counter LCDLY is negative. If negative, at step 326, the count of the delay counter LCDLY is reset to 0, then the control proceeds to step 328. On the other hand, if not negative, it proceeds as is to step 328. At step 328, the count of the delay counter LCDLY is incremented, then at steps 330 and 332, restriction is applied so that the count of the delay counter does not exceed the maximum value LTDR. When the count of the delay counter LCDLY increases to the maximum value LTDR, the air-fuel ratio flag LF1 is set to 1 (rich) at step 334, then the control proceeds to step 340. Note that the maximum value LTDR corresponds to the rich delay time for maintaining the judgement of being lean for a while even when the detection signal LV1 of the main air-fuel ratio detecting sensor 37 changes from lean to rich and is defined as a positive value.

At the following step 340, it is judged if the value of the air-fuel ratio flag LF1 is inverted. If yes, then the control proceeds to step 342. At step 342, it is judged if the air-fuel ratio flag LF1 is 0. If the air-fuel ratio flag FL1 is 0 (rich), the control proceeds to step 344, where the the rich skip amount LRSR is added to the feedback correction coefficient LFAF of the left cylinder bank 3 to increase the value in a skipping manner. On the other hand, when the air-fuel ratio flag LF1 is 1, the control proceeds to step 346, where the lean skip amount LRSL is subtracted from the feedback correction coefficient LFAF to reduce the value in a skipping manner.

On the other hand, when the value of the air-fuel ratio flag LF1 is not inverted at step 340, the control proceeds to step 348, where it is judged if the air-fuel ratio flag FL1 is 0. When the air-fuel ratio flag LF1 is 0, the control proceeds to step 350, where the rich integration constant LKIR is added to the feedback correction coefficient LFAF so as to gradually increase the feedback correction coefficient LFAF. On the other hand, when the air-fuel ratio flag LF1 is 1, the control proceeds to step 352, where the lean integration constant LKIL is subtracted from the feedback correction coefficient LFAF to gradually decrease the feedback correction coefficient LFAF. Here, the two skip amounts LRSR and LRSL are set sufficiently larger than the two integration constants LKIR and LKIL. Therefore, at steps 344 and 346, the fuel injection amounts are quickly corrected and, on the other hand, at steps 350 and 352, the fuel injection amounts are gradually corrected.

At the following steps 356, 358, 360, and 363, the value of the feedback correction coefficient LFAF is limited to the range of 1.2 to 0.8 and even when the value of the feedback correction coefficient LFAF is overly large or overly small or some reason or another, excess shifting of the air-fuel ratio to the rich side (over-rich state) or excess shifting to the lean side (over-lean state) is prevented.

Next, the control proceeds to step 364 where the feedback correction coefficient LFAF calculated above is stored in the RAM 61c and the backup RAM 61d, then the control proceeds to feedback control processing of the air-fuel ratio of the right cylinder bank 5.

In the feedback control processing of the air-fuel ratio of the right cylinder bank 5, the processing of steps 404 to 464 is completely the same as the processing of steps 304 to 364 of the feedback control processing of the air-fuel ratio of the left cylinder bank 3 except for differences in the places of storage of variables, counters, flags, etc., so an explanation will be omitted.

After the feedback control processing of the air-fuel ratio of the right cylinder bank 5 ends, the feedback control processing once ends.

After this, steps 302 to 464 of the feedback control processing of the air-fuel ratio are executed repeatedly at each predetermined interval. Therefore, feedback control of the air-fuel ratio is performed independently for each of the left and right cylinder banks 3 and 5 by the above-mentioned steps 302 to 464.

Figure 3:
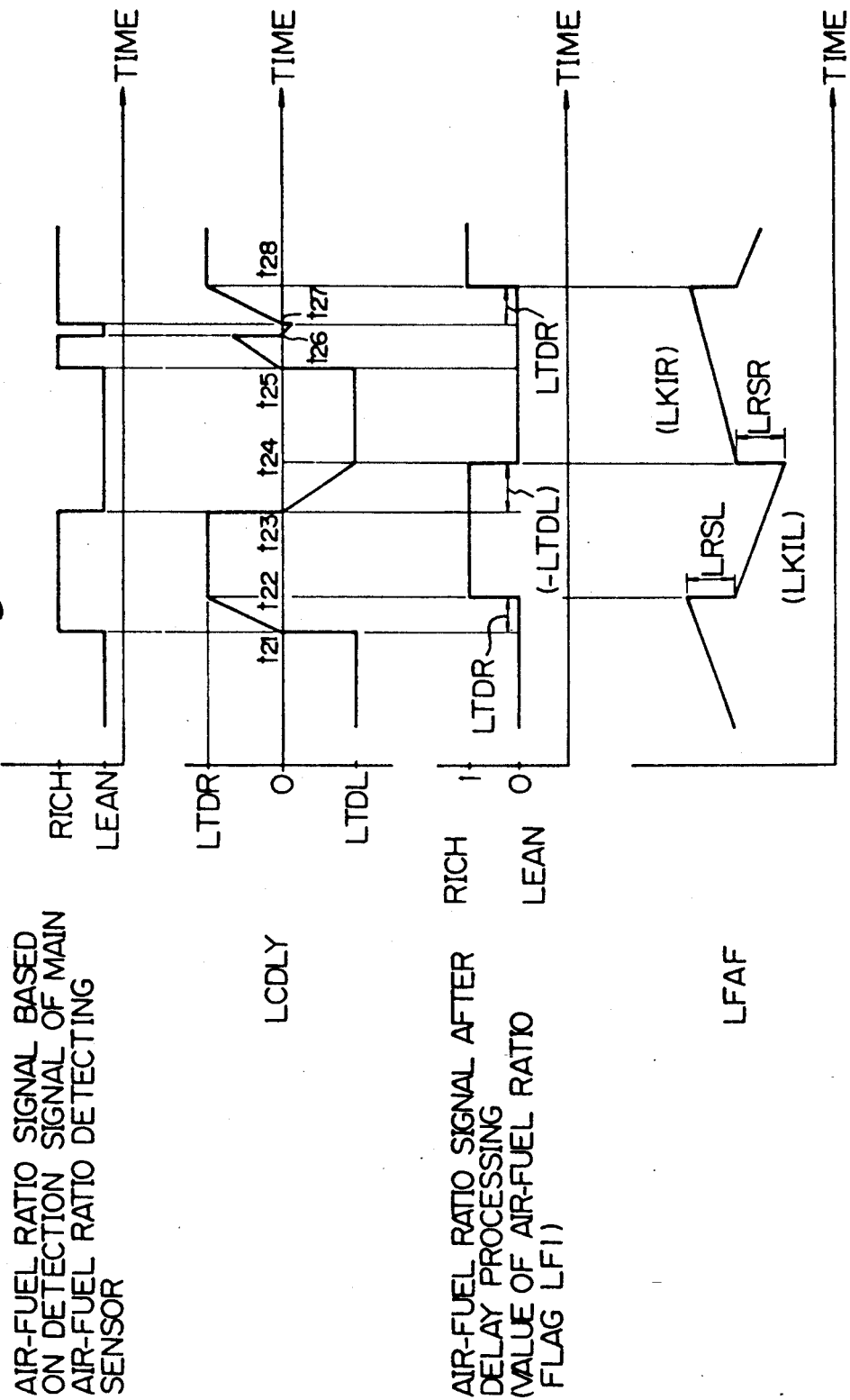
FIG. 3 is a time chart of the main air-fuel ratio detecting sensor detection signals and feedback correction coefficient.

An example of the state of control of the left cylinder bank 3 in the above control will be explained in accordance with the timing chart of FIG. 3. The same control is performed for the right cylinder bank 5, so an explanation of the same will be omitted.

At a time t21, when the air-fuel ratio signal A/F changes from lean to rich based on the detection signal of the main air-fuel ratio detecting sensor 37, the count of the delay counter LCDLY is reset, then counted up. The maximum value LTDR is reached at a time t22 after the elapse of the rich delay time LTDR. This being so, the delayed air-fuel ratio signal A/Fd (value of the air-fuel ratio flag LF1) changes from lean (0) to rich (1). Further, at the time t23, when the air-fuel ratio signal A/F changes from rich to lean based on the detection signal of the main air-fuel ratio detecting sensor 37, the count of the delay counter LCDLY is reset, then counted down and reaches the minimum value LTDL at a time t24 after the elapse of the lean delay time (−LTDL). This being so, the delayed air-fuel ratio signal A/Fd (value of air-fuel ratio flag LF1) changes from rich (1) to lean (0). However, for example, when the air-fuel ratio signal A/F based on the detection signal of the main air-fuel ratio detecting sensor inverts in a shorter time than the rich delay time LTDR as at times t25, t26, and t27, the time for the count of the delay counter LCDLY to reach the maximum value LTDR is extended and the delayed air-fuel ratio signal A/Fd inverts at the time t28. That is, the delayed air-fuel ratio signal A/Fd (value of air-fuel ratio flag LF1) becomes a value stabler than the air-fuel ratio signal A/F based on the detection signal of the main air-fuel ratio detecting sensor. In this way, the feedback correction coefficient LFAF is determined based on the relatively stabler delayed air-fuel ratio signal A/Fd.

Figure 5:
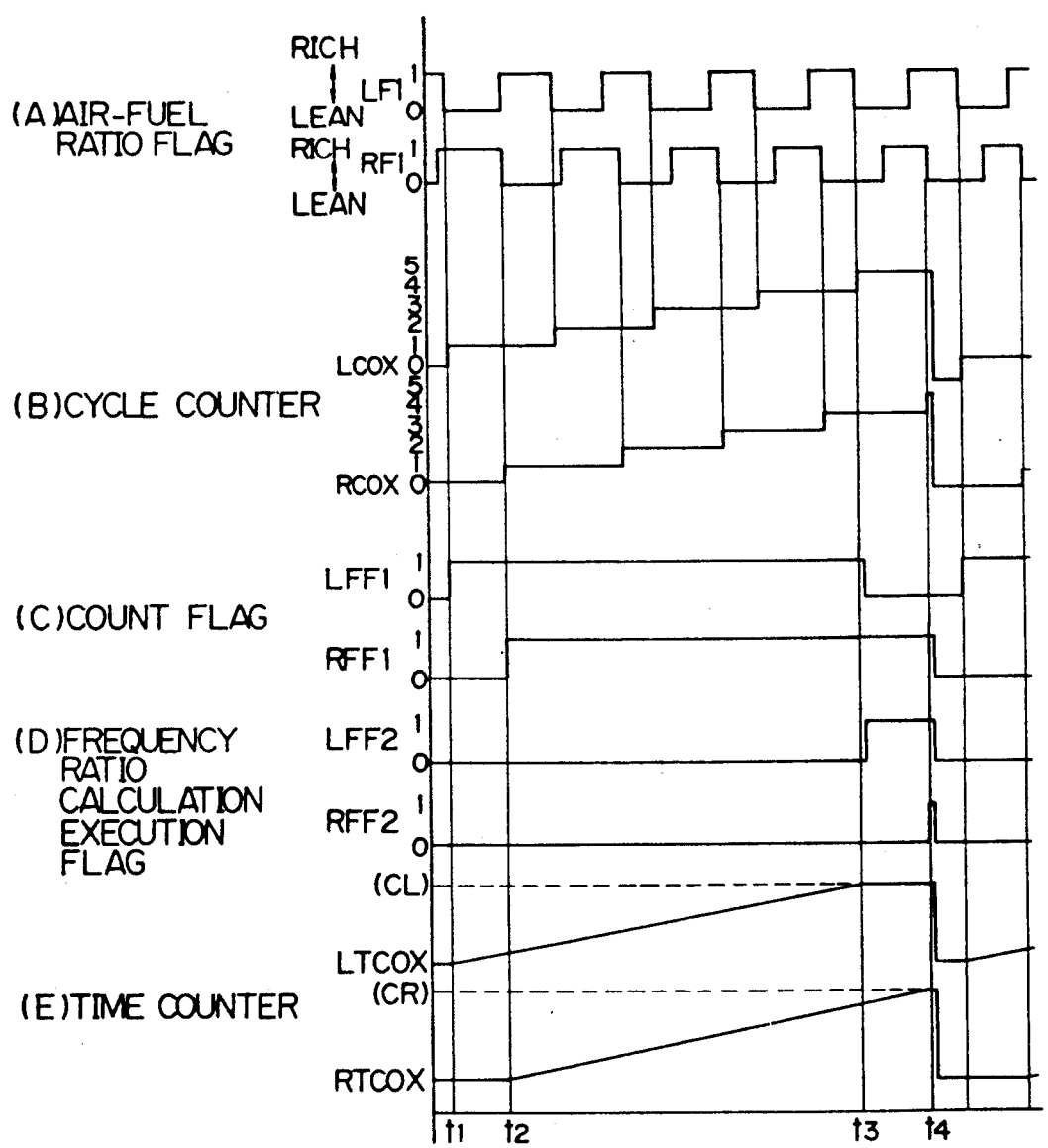
FIG. 5 is a time chart of the time counters LTCOX, RTCOX, etc.

Next, in the control of the air-fuel ratio executed by the control circuit 61, the frequencies of the output signals of the two main air-fuel ratio sensors 37 and 39 are found and the ratio of the same found. The processing for this will be explained here based on the flow chart of FIG. 4. This processing is executed at predetermined time intervals (for example, every 4 msec) after the startup of the control circuit 61. FIG. 5 is a timing chart of the processing.

First, at step 500, it is judged if feedback control is being performed in the two cylinder banks 3 and 5. If no feedback control is being executed, the processing is ended as is. If in the middle of feedback control, the control proceeds to step 410, where it is judged if the operating conditions such as the cooling water temperature, the engine load, and the engine rotational speed are in the range of conditions for execution of the processing. This judgement is made in that even with the same air-fuel ratio, the output frequencies of the air-fuel ratio detecting sensors 37 and 39 will differ depending on the operating conditions, so setting is performed so that the frequency ratio calculation processing is executed only within a certain range of operating conditions.

If these conditions do not stand, the processing ends as it is. If the conditions stand, the control proceeds to step 520, where it is judged if the output of the main air-fuel ratio detecting sensor 37 of the left cylinder bank 3 is inverted from rich to lean. This judgement is made, for example, based on the afore-mentioned air-fuel ratio flag LF1. Further, judgement may also be made directly based on the output A/F of the main air-fuel ratio detecting sensor 37.

As shown in the timing chart of FIG. 5, at the time t1, when the air-fuel ratio flag LF1 of the left cylinder bank inverts from rich to lean, the control proceeds to step 530 and the count flag LFF1 of the left cylinder bank is set. Next, at step 540, the left cylinder bank cycle counter LCOX is incremented. Next, at step 550, it is judged if the left cylinder bank cycle counter LCOX is above a predetermined value An. The predetermined value An is 5 in the case of the present embodiment. At first, LCOX<An, so the judgement is negative and control proceeds to step 590, where it is judged if the main air-fuel ratio flag RF1 of the right cylinder bank 5 has inverted from rich to lean. At this time, the main air-fuel ratio flag RF1 of the right cylinder bank 5 has not inverted from rich to lean, so the judgement is negative and the control proceeds to step 620, where it is judged if the right cylinder bank cycle counter RCOX is above a predetermined value An. The count of the RCOX has not started, so the control proceeds to step 651, where it is judged if the left cylinder bank count flag LFF1 is set.

As shown in FIG. 5, in the interval of time t1 to t2, LFF1 is 1, so the control proceeds to step 652, where the time counter LTCOX is incremented. Next, at step 653, the value of the LTCOX is stored in the RAM 61c.

At the next step 654, it is judged if the right cylinder bank count flag RFF1 is set or not. At the interval of time t1 to t2, RFF1 is 0, so the judgement is negative. The control proceeds to step 660, where it is judged if the ratio calculation execution flag LFF2 is set. At this time, LFF2 is not set, so the processing ends.

At the time t2, the air-fuel ratio flag RF1 of the right cylinder bank 5 inverts from rich to lean, so the judgement at step 590 is positive and the control proceeds to step 600, where the right cylinder bank count flag RFF1 is set. Next, at step 610, the right cylinder bank cycle counter RCOX is incremented.

Since RFF1 is 1, the judgement at step 654 is affirmative, and the time counter RTCOX is incremented at step 655. Next, at step 656, the value of RTCOX is stored in the RAM 61c. In this way, as shown in FIG. 5(E), the time counters LTCOX and TRCOX for the calculation of the frequency ratio in the cylinder banks 3 and 5 going on counting. During this period, so long as the two conditions of LFF2=1 and RFF2=1 are not satisfied, the judgement is negative at step 660 or step 670 and the processing ends.

After this, each time the outputs of the main air-fuel ratio detecting sensors 37 and 39 are inverted from rich to lean, the processing of step 540 or step 610 is executed and the two cylinder bank cycle counters LCOX and RCOX are counted up. Even during that period, the counters LTCOX and RTCOX continue to count up (steps 652 and 655).

When, at the time t3, the cycle counter LCOX of the left cylinder bank 3 reaches An (=5), the judgement is affirmative at step 550 and the control proceeds to step 560, where the count flag LFF1 is reset. Next, at step 580, the frequency ratio calculation execution flag LFF2 is set.

At step 651, since LFF1=0, the judgement is negative and the time counter LTCOX of the left cylinder bank 3 does not count up, so the value at the time of the time t3 is held as it is. Further, the count-up processing of the time counter TRCOX of the right cylinder bank 5 of step 655 is continued since RFF1 is still 1.

When, at the time t4, the cycle counter TCOX of the right cylinder bank 5 reaches An (=5), the judgement at step 620 is affirmative, so the control proceeds to step 630 and the count flag RFF1 is reset. Next, at step 650, the frequency ratio calculation execution flag RFF2 is set.

Therefore, at step 654, since RFF1 is 0, the judgement is negative and the time counter TRCOX of the right cylinder bank 5 is not incremented, but held at the value of the time of the time t4.

In this way, when both the frequency ratio calculation execution flags LFF2 and RFF2 of the two cylinder banks 3 and 5 are set, the judgement at steps 660 and 670 is affirmative and the control proceeds to step 680.

At step 680, the value of the time counter LTCOX of the left cylinder bank 3 is read from the RAM 61c. Further, at step 690, the value of the time counter RTCOX of the right cylinder bank 5 is read. Next, at step 700, as shown by the following equation, the ratio COR of the value of the LTCOX and the value of the RTCOX is calculated:

COR=RTCOX/LTCOX

The values of the counters RTCOX and LTCOX show the time of four cycles of the air-fuel ratio flags LF1 and RF1, but the cycles and frequencies are in inverse proportion to each other, so COR is the same as the value of the frequency at the left cylinder bank 3 divided by the frequency at the right cylinder bank 5 and COR may be found as the frequency ratio.

Next, LFF2 is reset at step 710, LCOX is cleared at step 715, LTCOX is cleared at step 720, RFF2 is reset at step 730, RCOX is cleared at step 735, and RTCOX is cleared at step 740.

After this, the judgement is affirmative at steps 500 and 510. If the conditions for execution of the processing stand, the above processing is executed and the frequency ratio COR goes on to be updated.

When the frequency ratio COR is larger than 1.0, this shows that the air-fuel ratio at the left cylinder bank 3 is richer compared with the air-fuel ratio at the right cylinder bank 5. Conversely, if the frequency ratio COR is smaller than 1.0, it shows that the air-fuel ratio at the left cylinder bank 3 is leaner than the air-fuel ratio at the right cylinder bank 5. The air-fuel ratio shown by the value of the frequency ratio COR is a relative one and does not show an absolute air-fuel ratio. Therefore, whether the absolute air-fuel ratios of the cylinder banks 3 and 5 are rich or lean are unknown from just the value of the frequency ratio COR.

Next, at the control circuit 61, the frequency ratio COR is used for control to match the frequencies of the outputs of the main air-fuel ratio detecting sensors 37 and 39 of the cylinder banks 3 and 5 match by the processing for calculation of the integration constant shown in FIG. 6. This processing is repeated executed at predetermined intervals, for example, at every 4 msec.

At step 910, it is judged if the frequency ratio COR is over 1.0 or not. If over it, that is, if the air-fuel ratio of the left cylinder bank 3 is richer than the air-fuel ratio of the right cylinder bank 5, the judgement is affirmative and the control proceeds to step 920, where it is judged if the left cylinder bank rich flag LRF is set or not. At first, it is not set, so the judgement is negative and the control proceeds to step 930, where the rich integration constant RKIR used for increasing the feedback correction coefficient RFAF at step 450, is increased in accordance with the value of the frequency ratio COR as shown by the following equation. That is, processing is performed to bring the air-fuel ratio of the right cylinder bank 5 close to the left cylinder bank 3.

$$RKIR \leftarrow RKIR + \alpha \times COR$$

where, $\alpha$ is a predetermined conversion coefficient.

Next, at step 940, it is judged if the rich integration constant RKIR is above an upper limit B. If above B, the control proceeds to step 950, where the value of B is set in the RKIR. Next, at step 960, the right cylinder bank lean flag LLF is set. On the other hand, if the judgement is negative at step 940, steps 950 and 960 are skipped. Next, at step 970, the lean integration constant RKIL of the right cylinder bank 5 is set as in the following equation:

$$RKIL \leftarrow 2A - RKIR$$

where, A is the value set as the initial value of the right cylinder bank lean integration constant RKIL and the right cylinder bank rich integration constant RKIR.

Next, at step 980, it is judged if the left cylinder bank lean flag LLF is set. If set, the control proceeds to step 990, where the left cylinder bank rich integration constant LKIR and the left cylinder bank lean integration constant LKIL are set by the following equations:

$$LKIR \leftarrow LKIR - \beta \times COR$$

$$LKIL \leftarrow 2A - LKIR$$

where $\beta$ is a conversion coefficient.

If the judgement is negative at step 980, the processing is ended once.

Here, step 990 is executed only when LLF = 1, that is, when RKIR has reached the upper limit B because it is judged difficult to obtain a balance in frequencies with just control of the air-fuel ratio of the right cylinder bank to the rich side. This is something which occurs when the air-fuel ratio of the left cylinder bank 3 leans to the rich side. Therefore, in addition to the enrichment of the air-fuel ratio at the right cylinder bank 5, the air-fuel ratio at the left cylinder bank 3 is controlled to the lean side by the processing of step 990.

After this, so long as COR > 1.0 and LRF = 0, the same processing is repeated and the air-fuel ratio at the right cylinder bank 5 is moved to the rich side compared with the air-fuel ratio at the left cylinder bank 3 by increasing the right cylinder bank rich integration constant RKIR and further by reducing the right cylinder bank lean integration constant RKIR. Further, in accordance with need, the air-fuel ratio at the left cylinder bank 3 is shifted relatively to the lean side at step 990 by correcting the left cylinder bank lean integration constant LKIL and the left cylinder bank rich integration constant LKIR.

When COR becomes 1.0, the output cycles of the air-fuel ratio detecting sensors 37 and 39 are in suitable balance, the judgement at steps 910 and 1050 is negative, and the processing ends without the execution of the processing for correction of the integration constants.

Next, when COR < 1.0, the judgement is affirmative at step 1050 and the control proceeds to step 1060, where it is judged if the left cylinder bank flag LLF is set. At this time, if LLF is already made 1 at step 960, the judgement is affirmative and the control proceeds to step 1070, where the integration constant LKIR of the left cylinder bank 3 is corrected by the following equation:

$$LKIR \leftarrow LKIR + \beta/COR$$

That is, the fact that LLF is 1 means that the processing of step 990 was performed and LKIR should be a value lower than the standard value A. That is, it shows that the integration constants LKIR, LKIL, RKIR, and RKIL are not balanced and that some values are off. Therefore, first, processing is performed to balance the output frequencies of the air-fuel ratio detecting sensors 37 and 39 by restoring LKIR to the standard value A.

Next, at step 1080, it is judged if the LKIR is above the standard value A. At first, LKIR is less than the standard value A, so the judgement is negative an the control proceeds to step 1110, where the lean integration constant LKIL is corrected by the following equation:

$$LKIL \leftarrow 2A - LKIR$$

where, A is the same value as A of step 970.

After this, so long as COR < 1.0 and LLF = 1, the above processing is repeated. In this way, when LKIR is increased and reaches A, the judgement is affirmative at step 1080 and the control proceeds to step 1090, where the standard value A is set for the LKIR. Further, at step 1100, the left cylinder bank lean flag LLF is reset, then the control proceeds to step 1110 where the processing is ended.

If LKIR is above A, LLF is 0, so the judgement at step 1060 is negative and the control proceeds to step 1120, where the RKIR is set by the following equation:

$$RKIR \leftarrow RKIR - \alpha/COR$$

Next, at step 1130, it is judged if RKIR is below a lower limit C. If RKIR is below C, the control proceeds to step 1140, where the value of C is set to RKIR. Next, at step 1150, the left cylinder bank rich flag LRF is set. On the other hand, if the judgement is negative at step 1130, the steps 1140 and 1150 are skipped. At step 1160, the lean integration constant RKIL of the right cylinder bank 5 is set as shown by the following equation.

$$RKIL \leftarrow 2A - RKIR$$

where, A is the value set as the initial values of the integration constants RKIL and RKIR of the right cylinder bank 5 as mentioned above.

Next, at step 1170, it is judged if the left cylinder bank rich flag LRF is set. If set, the control proceeds to step 1180, where the integration constants LKIR, LKIL of the left cylinder bank 3 are set by the following $$LKIR \leftarrow LKIR + \beta/COR$$

$$LKIL \leftarrow 2A - LKIR$$

If the judgement at step 1170 is negative, the processing is ended as it is.

Here, step 1180 is executed only when LRF is 1, that is when RKIR has reached the lower limit C, because it is difficult to obtain a balance in the frequencies with just control of the air-fuel ratio of the right cylinder bank 5 to the lean side. This is a phenomenon which occurs when the air-fuel ratio at the left cylinder bank 3 leans to the lean side. Therefore, in addition to making the right cylinder bank 5 leaner, the processing of step 1180 is performed to control the left cylinder bank 3 to the rich direction.

After this, when COR becomes 1.0, it is considered that the output cycles of the air-fuel ratio detecting sensors 37 and 39 are in a suitable balance and the judgement is negative at steps 910 and 1050, so the processing ends without execution of the processing for correction of the integration constant.

Next, when COR becomes greater than 1.0, the judgement at step 910 is affirmative and it is judged at step 920 if the left cylinder bank rich flag LRF is set. At this time, if the LRF becomes 1 at step 1150, the judgement is affirmative and the control proceeds to step 1190, where the integration constant LKIR of the left cylinder bank 3 is corrected by the following equation:

$$LKIR \leftarrow LKIR - \beta \times COR$$

That is, the fact that LRF is 1 means that the processing of step 1180 was performed and that LKIR should be a higher value than the standard value A. That is, the integration constants LKIR, LKIL, RIKR, and RKIL are not balanced and some values are off. Therefore, processing is performed to balance the output frequencies of the air-fuel ratio detecting sensors by first reducing LKIR toward the standard value A.

Next, at step 1200, it is judged if LKIR is lower than the standard value A. At first, LKIR is larger than the standard value A, so the judgement is negative and control proceeds to step 1230, where the lean integration constant LKIL is corrected by the following equation:

$$LKIL \leftarrow 2A - LKIR$$

After this, in so far as COR is greater than 1.0 and LRF is 1, the above processing is repeated. In this way, when LKIR is reduced and reaches A, the judgement at step 1200 is affirmative and the control proceeds to 1210, where the standard value A is set for LKIR. Further, at step 1220, the left cylinder bank rich flag LRF is reset and, after the processing at step 1230, the processing is once ended.

In this way, the values of the integration constants LKIR, LKIL, RKIR, and RIKL are adjusted so that COR approaches 1.0.

Next, an explanation will be made of the control for feedback correction of the two cylinder banks 3 and 5 using the output of the auxiliary air-fuel ratio detecting sensor 41 based on the flow chart of FIG. 7. This control differs from the processing for calculation of the integration constant shown in FIG. 6 and corrects unilaterally the air-fuel ratio feedback control of the two cylinder banks 3 and 5. It is executed at predetermined intervals (for example, every 512 msec) after the start of the control circuit 61.

First, at step 1300, it is judged if the conditions for execution of the feedback correction stand. If the conditions do not stand, at step 1310, the initial values LRSRO and LRSLO are set for the rich skip amount LRSR and the lean skip amount LRSL of the left cylinder bank 3 and, at step 1320, the initial values RRSRO and RRSLO are set for the rich skip amount RRSR and the lean skip amount RRSL of the right cylinder bank 5.

If it is judged that the conditions for execution of feedback correction stand, the control proceeds to step 1330, where processing is performed for A/D conversion and reading of the detection signal V2 of the auxiliary air-fuel ratio detecting sensor 41. Next, at step 1340, it is judged if the detection signal V2 is lower than the second comparative voltage VR2 (for example, 0.55V).

If the judgement is affirmative, it is judged that this shows that the air-fuel ratio detection signal of the mixed exhaust of the two cylinder banks 3 and 5 is lean and the control passes to step 1350. At step 1350, the rich skip amount LRSR and RRSR values of the two cylinder banks 3 and 5 are incremented by a predetermined value $\Delta S$ as shown by the following equation:

$$LRSR \leftarrow LRSR + \Delta RS$$

$$RRSR \leftarrow RRSR + \Delta RS$$

Next, at steps 1360 and 1370, the value of the rich skip amount LRR of the left cylinder bank 3 is restricted to under the maximum amount LRMAX then at steps 1380 and 1390, the value of the rich skip amount RRSR of the right cylinder bank 5 is restricted to under the maximum value RRMAX.

Next, at step 1400, the lean skip amounts LRSL and RRSL of the two cylinder banks 3 and 5 are decremented by the predetermined values $\Delta RS$ as in the following equations:

$$LRSL \leftarrow LRSL - \Delta RS$$

$$RRSL \leftarrow RRSL - \Delta RS$$

Next, at steps 1410 and 1420, the value of the lean skip amount LRSL of the left cylinder bank 3 is restricted to over the minimum value LLMIN and then at steps 1430 and 1440, the value of the lean skip amount RRSL of the right cylinder bank 5 is restricted to above the minimum value RLMIN. In this way, the lean skip amounts LRSR and RRSR are increased for correction and the lean skip amounts LRSL and RRSL are reduced for correction to facilitate the movement of the air-fuel ratio to the rich side.

On the other hand, if the judgement at step 1340 is negative, it is judged that the air-fuel ratio of the gas comprised of the mixture of the exhausts of the two cylinder banks 3 and 5 is rich and the control proceeds to the step 1450. At the step 1450, the values of the rich skip amounts LRSR and RRSR of the two cylinder banks 3 and 5 are decremented by the predetermined value $\Delta RS$ as shown in the following equations:

$$LRSR \leftarrow LRSR - \Delta RS$$

$$RRSR \leftarrow RRSR - \Delta RS$$

Next, at steps 1460 and 1470, the value of the rich skip amount LRSR of the left cylinder bank 3 is restricted to above the minimum value LRMIN and then at steps 1480 and 1490 the value of the rich skip amount RRSR of the right cylinder bank 5 is restricted to above the minimum value RRMIN.

Next, at step 1500, the values of the lean skip amounts LRSL and RRSL of the two cylinder banks 5 are incremented by the predetermined value $\Delta RS$ as shown in the following equations:

$$LRSL \leftarrow LRSL + \Delta RS$$

$$RRSL \leftarrow RRSL + \Delta RS$$

Next, at the steps 1510 and 1520, the value of the lean skip amount LRSL of the left cylinder bank 3 is restricted to under the maximum value LLMAX and then at steps 1530 and 1540 the value of the lean skip amount RSL of the right cylinder bank 5 is restricted to below the maximum value RLMAX. In this way, the lean skip amounts LRSR and RRSR are reduced for correction and the lean skip amounts LRSL and RRSL are increased for correction to facilitate the movement of the air-fuel ratio to the lean side.

Here, for example, the maximum values LRMAX, RRMAX, LLMAX, and RLMAX are 7.5 percent and the minimum values LLMIN, RLMIN, LRMIN, and RRMIN are 2.5 percent. Note that here the maximum values are the values of the range where there is no deterioration of the drivability due to fluctuations of the air-fuel ratio, while the minimum values are the values of the range where there is no reduction of the transitional following characteristic.

Figure 8:
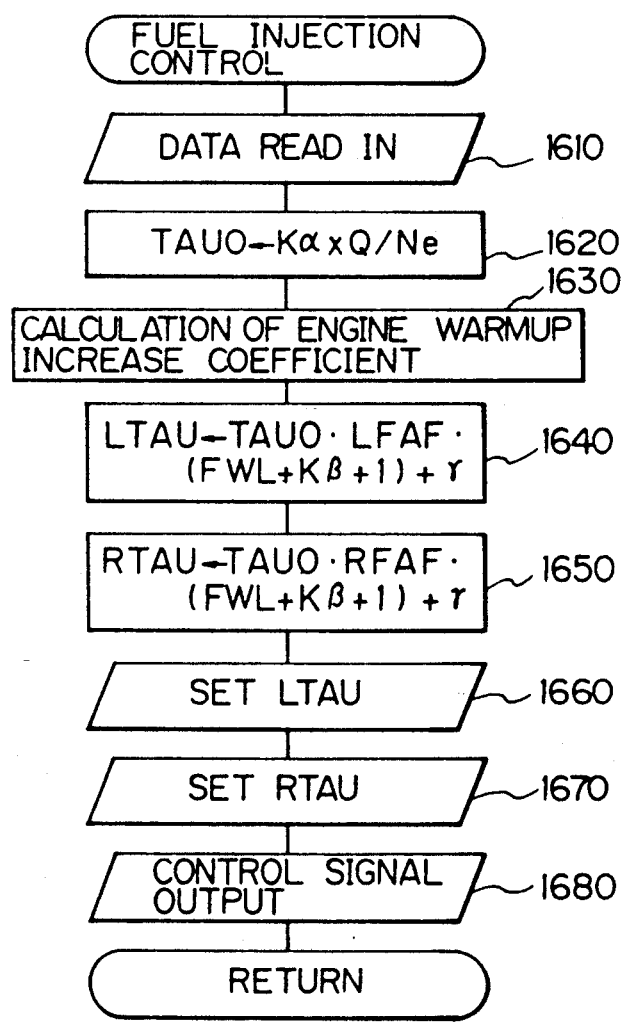
FIG. 8 is a flow chart of the execution of the fuel injection control.

Next, an explanation will be made of the processing for control of the fuel injection performed based on the various parameters calculated in the above manner, based on the flow chart shown in FIG. 8. The processing for control of the fuel injection is executed with every predetermined crank angle (for example, 360° CA) after the startup of the control circuit 61. First, at step 1610, processing is performed for reading in the above-mentioned parameters. Next, at step 1620, the processing is performed for calculating the basic fuel injection amount TAUO by the following equation from the constant $K\alpha$, intake air amount Q, and rotational speed Ne:

$$TAUO = Ka \times Q/Ne$$

Figure 9:
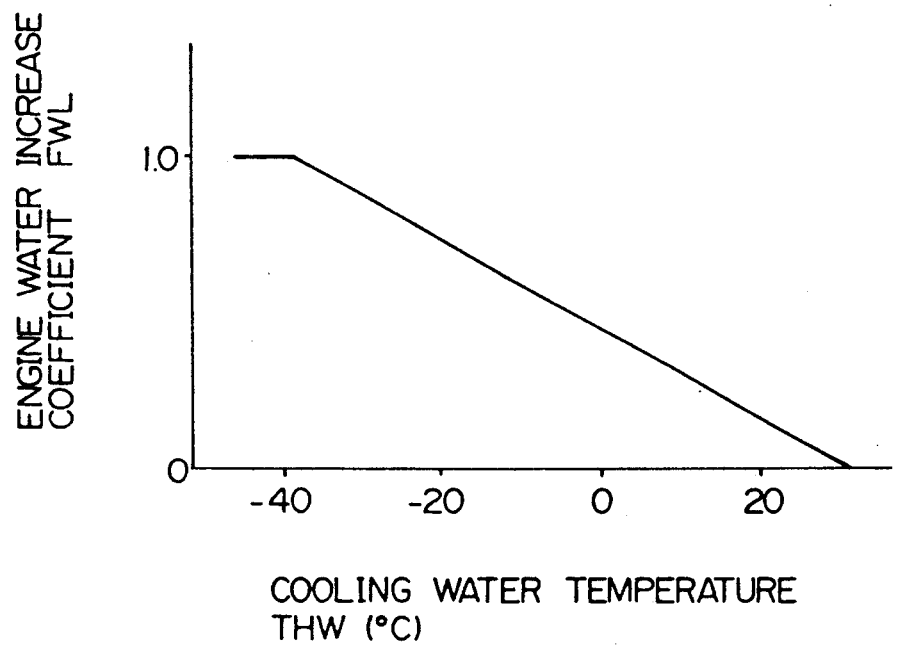
FIG. 9 is a view showing the relationship between the cooling water temperature and coefficient of increased fuel during engine warmup.

Next, at step 1630, processing is performed for calculating the engine warmup increase coefficient FWL in accordance with the cooling water temperature THW by complementary calculation in accordance with the map shown in FIG. 9 and stored in the ROM 61b. Next, the control proceeds to step 1640, where processing is performed for calculating the real fuel injection amount LTAU of the left cylinder bank 3 by the following equation: Here, $K\beta$ and $\gamma$ are correction coefficients determined in accordance with the other operating parameters:

$$LTAU = TAUO \times LFAF \times (FWL + K\beta + 1) + \gamma$$

Next, the control proceeds to step 1650, where processing is performed by the following equation to calculate the real fuel injection amount RTAU of the right cylinder bank 5:

$$RTAU = TAUO \times RFAF \times (FWL + K\beta + 1) + \gamma$$

Note that $K\beta$ and $\gamma$ may be separately set for the left and right cylinder banks 3 and 5.

Next, at step 1660, the real fuel injection amount LTAU calculated at step 1640 is set in the left cylinder bank 3 down counter 61n-1. Further, at step 1670, the real fuel injection amount RTAU calculated at step 1650 is set in the right cylinder bank 5 down counter 61n-2.

Next, at step 1680, the control signals for setting the flipflop circuits 61p-1 and 61p-2 are output and the fuel injections of the two cylinder banks 3 and 5 are begun. In this way, the fuel injection control processing is ended.

Note that as mentioned above, when the time corresponding to the real fuel injection amounts LTAU and RTAU elapses, the flip-flops 61p-1 and 61p-2 are reset by the carry out signals of the down counters 61n-1 and 61n-2 and the fuel injections are ended.

Due to the above construction of this embodiment, among the deviations in feedback control of the air-fuel ratio performed for each of the cylinder banks 3 and 5, first the relative deviation is judged by calculation of the frequency ratio COR of the air-fuel ratio detecting sensors 37 and 39 and then, based on this frequency ratio COR, either the rich integration constants LKIR and RKIR or the lean integration constants LKIL and RKIL, the parameters for determining the changes in the feedback correction coefficients LFAF and RFAF in the cylinder banks 3 and 5, are corrected or the rich integration constants LKIR and RKIR and the lean integration constants LKIL and RKIL are both corrected (FIG. 6). By this, control is performed for eliminating the relative deviation between the left and right cylinder banks 3 and 5.

Further, among the control deviations of the feedback control of the air-fuel ratio, for the absolute deviation, the auxiliary air-fuel ratio detecting sensor 41 detects the air-fuel ratio of the mixed exhaust of the two cylinder banks 3 and 5 and the rich skip amounts LRSR and RRSR and the lean skip amounts LRSL and RRSL of the feedback control of the two cylinder banks 3 and 5 are corrected (FIG. 7).

Therefore, even if the air-fuel ratio feedback of the two cylinder banks 3 and 5 is corrected by the single auxiliary air-fuel ratio detecting sensor 41, the relative deviation between the cylinder banks 3 and 5 can be eliminated, so it is possible to control the air-fuel ratios at the two cylinder banks 3 and 5 to the target air-fuel ratio, for example, the stoichiometric air-fuel ratio. Thus, it is possible to prevent the early reduction of the cleaning performance and maintain an excellent fuel efficiency and emission. Further, since a single auxiliary air-fuel ratio detecting sensor is enough, space can be saved and the mountability can be improved.

In this embodiment, in the processing for calculation of the integration constants of FIG. 6, the integration constants of the right cylinder bank 5 are corrected first and if the correction is excessive, the integration constants of the left cylinder bank 3 are corrected, but the reverse control of the left and right cylinder banks 3 and 5 is also possible. Further, the correction may be limited to either the left cylinder bank 3 or the right cylinder bank 5.

Further, in this embodiment, in the feedback correction control processing of FIG. 7, the skip amounts of the left and right cylinder banks 3 and 5 were corrected, but just that of the left cylinder bank 3 or the right cylinder bank 5 may be corrected as well. For example, when correcting the skip amount of the left cylinder bank 3, the integration constants of at least the right cylinder bank 5 may be corrected so as to eliminate the relative deviation between the left and right cylinder banks 3 and 5. Conversely, when correcting the skip amount of the right cylinder bank 5, the integration constants of at least the left cylinder bank 3 may be corrected so as to eliminate the relative deviation between the left and right cylinder banks 3 and 5.

Further, conversely with the above-mentioned processing for calculation of the integration constants (FIG. 6) and the processing for control of the feedback correction (FIG. 7), the correction by the auxiliary air-fuel ratio detecting sensor 41 may be performed based on the correction of the integration constants LKIR, RKIR, LKIL, and RKIL and the correction by the frequency ratio COR may be performed based on the correction of the skip amounts LRSR, RRSR, LRSL, and RRSL. Further, the correction by the auxiliary air-fuel ratio detecting sensor 41 may be performed based on the correction of the integration constants LKIR, RKIR, LKIL, RKIL, and the skip amounts LRSR, RRSR, LRSL, and RRSL, and the correction by the frequency ratio COR may be performed based on the correction of the integration constants LKIR, RKIR, LKIL, RKIL and the skip amounts LRSR, RRSR, LRSL, and RRSL. Further, the delay times LTDL and LTDR may be corrected. Further, it is possible to suitably select and use various combinations of these. An example of this will be explained next as a second embodiment.

Figure 10B:
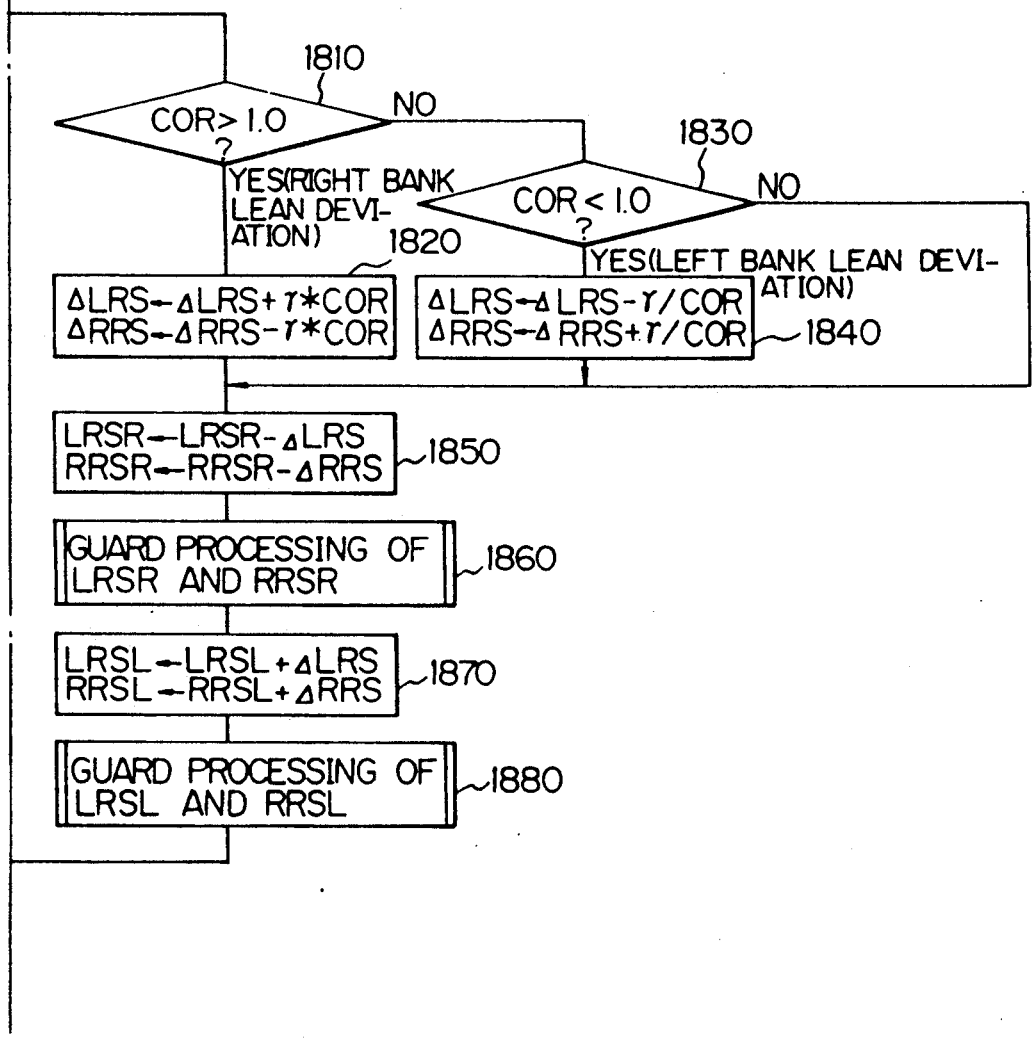
FIG. 10 (FIGS. 10A and 10B) is a flow chart of the control of the skip value by the frequency ratio and the detection signal of the auxiliary air-fuel ratio detecting sensor.

This embodiment differs from the first embodiment only in the content of the feedback correction control shown in FIG. 7. The other facets of the construction are the same. Therefore, the explanation will be made only of the feedback correction control. A flow chart of the control is shown in FIG. 10. This control is performed repeatedly with every predetermined time (for example, 512 msec) after the startup of the control circuit 61. In this processing, both correction based on the output value of the auxiliary air-fuel ratio detecting sensor 41 and the correction based on the frequency ratio COR are performed.

First, at step 1700, it is judged if the conditions for execution of the feedback correction control stand. The conditions for execution may be made the same as the conditions for execution of the processing of the feedback control of the main air-fuel ratio (steps 304 and 404).

If the conditions do not stand, the processing ends at that point. If they stand, the control proceeds to step 1710, where the output V2 of the auxiliary air-fuel ratio detecting sensor 41 is subjected to A/D conversion and read in. Next, at step 1720, it is judged if V2 is below a reference value VR2. That is, it is judged if the output shows a lean state or shows a rich state.

Here, if the judgement is affirmative, that is, if it is judged that the lean state exists, it is judged at step 1730 if COR is greater than 1.0. If the judgement is affirmative, at step 1740, the correction amounts $\Delta$LRS and $\Delta$RRS of the skip values LRSR, LRSL, RRSR, and RRSL of the feedback correction coefficients LFAF and RFAF are calculated by the following equations:

$$\Delta LRS \leftarrow \Delta LRS - \gamma \times COR$$

$$\Delta RRS \leftarrow \Delta RRS + \gamma \times COR$$

Further, when COR is smaller than 1.0, a negative judgement is made at step 1730, an affirmative judgement is made at step 1750, and the control proceeds to step 1760, where the correction amounts $\Delta$LRS and $\Delta$RRS are calculated according to the following equations:

$$\Delta LRS \leftarrow \Delta LRS + \gamma/COR$$

$$\Delta RRS \leftarrow \Delta RRS - \gamma/COR$$

Further, when COR is 1.0, the correction amounts $\Delta$LRS and $\Delta$RRS are not corrected. At step 1770, the rich skip amounts LRSR and RRSR of the two cylinder banks 3 and 5 are calculated as shown by the following equations:

$$LRSR \leftarrow LRSR + \Delta LRS$$

$$RRSR \leftarrow RRSR + \Delta RRS$$

Next, at step 1780, guard processing is performed so that the rich skip amounts LRSR and RRSR of the left and right cylinder banks 3 and 5 do not become excessively large. For example, they are limited to below the upper limits.

Next, at step 1790, the lean skip amounts LRSL and RRSL of the left and right cylinder banks 3 and 5 are calculated as shown by the following equations:

$$LRSL \leftarrow LRSL - \Delta LRS$$

$$RRSL \leftarrow RRSL - \Delta RRS$$

Next, at step 1800, guard processing is performed so that the lean skip amounts LRSL and RRSL do not become excessively small.

That is, the processing of steps 1770 and 1790 increases the rich skip amounts LRSR and RRSR of the left and right cylinder banks 3 and 5 and reduces the lean skip amounts LRSL and RRSL so that the air-fuel ratios of the two cylinder banks 3 and 5 move overall to the rich side, since it is determined by the auxiliary air-fuel ratio detecting sensor 41 that the mean air-fuel ratio of the two cylinder banks 3 and 5 is lean.

Further, in the correction amounts $\Delta$LRS and $\Delta$RRS are included corrections for the deviations between the left and right cylinder banks 3 and 5 based on the frequency ratio COR. These serve not for the feedback correction of not only the absolute, but also the relative air-fuel ratios.

When the judgement at step 1720 is negative, that is, when the judgement is a rich state, the reverse control as with the lean state is performed.

That is, it is judged at step 1810 if COR is greater than 1.0. If the judgement is affirmative, the correction amounts $\Delta$LRS and $\Delta$RRS of the skip values of the feedback correction coefficients LFAF and RFAF are calculated by the following equations at step 1820:

$$\Delta LRS \leftarrow \Delta LRS + \gamma \times COR$$

$$\Delta RRS \leftarrow \Delta RRS - \gamma \times COR$$

Further, when COR is less than 1.0, the judgement at step 1810 is negative, the judgement at step 1830 is affirmative, and the control proceeds to step 1840, where the correction amounts $\Delta$LRS and $\Delta$RRS of the skip values are calculated by the following equations:

$$\Delta LRS \leftarrow \Delta LRS - \gamma/COR$$

$$\Delta RRS \leftarrow \Delta RRS + \gamma/COR$$

Further, when COR is 1.0, the correction amounts $\Delta$LRS and $\Delta$RRS are not corrected and, including cases where the processing of steps 1820 and 1840 ends, the rich skip amounts LRSR and RRSR of the two cylinder banks 3 and 5 are calculated as follows at step 1850:

$$LRSR \leftarrow LRSR - \Delta LRS$$

$$RRSR \leftarrow RRSR - \Delta RRS$$

Next, at step 1860, guard processing is performed so that the rich skip amounts LRSR and RRSR do not become excessively small. For example, they are restricted to above a lower limit.

Next, at step 1870, the lean skip amounts LRSL and RRSL are calculated as in the following equation:

$$LRSL \leftarrow LRSL + \Delta LRS$$

$$RRSL \leftarrow RRSL + \Delta RRS$$

Next, at step 1880, guard processing is performed so that the lean skip amounts LRSL and RRSL do not become excessively large. For example, they are restricted to below an upper limit.

That is, the processing of steps 1850 and 1870 is performed to reduce the rich skip amounts LRSR and RRSR and to increase the lean skip amounts LRSL and RRSL so that the air-fuel ratios of the two cylinder banks 3 and 5 move to the lean side, since it is learned at step 1730 by the auxiliary air-fuel ratio detecting sensor 41 that the mean air-fuel ratio of the two cylinder banks 3 and 5 is on the rich side.

Further, in the correction amounts $\Delta LRS$ and $\Delta RRS$ are included corrections for the deviations between the left and right cylinder banks 3 and 5 based on the frequency ratio COR. These serve not for the feedback correction of not only the absolute, but also the relative air-fuel ratios.

According to the present embodiment, the correction amounts $\Delta LRS$ and $\Delta RRS$ of the skip amounts are set in accordance with the frequency ratio COR, so the relative deviation of the left and right cylinder banks 3 and 5 can be quickly eliminated.

In this way, in this embodiment, the feedback correction control shown in FIG. 10 includes correction of the mean air-fuel ratio of all the cylinder banks and correction of the relative air-fuel ratio of the left and right cylinder banks 3 and 5, so it is possible to eliminate the integration constant calculation processing (FIG. 6) such as performed in the first embodiment.

In the above embodiments, when correcting the feedback control of the air-fuel ratio in accordance with the frequency ratio COR or the output value of the auxiliary air-fuel ratio detecting sensor 41, the skip values LRSR, LRSL, RRSR, and RRSL of the feedback correction coefficients LFAF and RFAF of the cylinder banks 3 and 5 are corrected or the integration constants LKIR, LKIL, RKIR, and RKIL are corrected, but it is also possible to correct one or both of the output judgement values LVR1 and RVR1 of the main air-fuel ratio detecting sensors 37 and 39 or correct a suitable combination of the delay times LTDR, LTDL, RTDR, and RTDL.

Figure 11A:
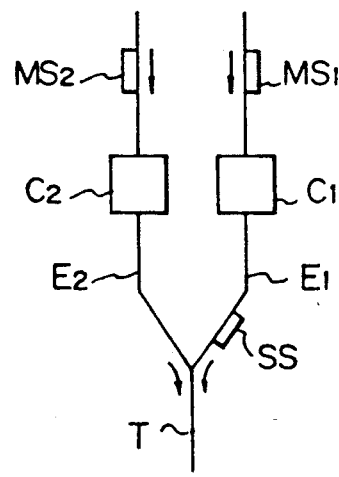
FIG. 11 (FIGS. 11A and 11B) is a schematic view of another embodiment with a different shape of the exhaust passages and mounting position of the auxiliary air-fuel ratio detecting sensor.
Figure 11B:
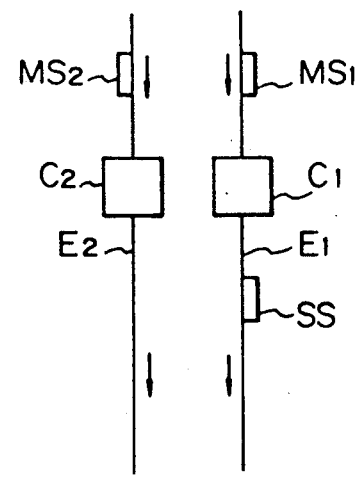

In the first and second embodiments, one main air-fuel ratio detecting sensor 37 or 39 was provided in each exhaust manifold 25 and 27 and the auxiliary air-fuel ratio detecting sensor 41 was provided in the convergence pipe 33, but the constructions shown in FIG. 11(A) and FIG. 11(B) are also possible.

FIG. 11(A) differs from the first and second embodiments in that the auxiliary air-fuel ratio detecting sensor SS is positioned not in the convergence pipe T, but in one of the exhaust manifolds E1. The main air-fuel ratio detecting sensors MS1 and MS2 and the catalytic converters C1 and C2 are positioned at the same locations. With this construction, it is possible to achieve the object of the invention by the same control as with the first and second embodiments. That is, the control deviation due to the two main air-fuel ratio detecting sensors MS1 and MS2 is repeatedly corrected by the detection values of the auxiliary air-fuel ratio detecting sensor SS, but with just this control, only one of the main air-fuel ratio detecting sensors MS1 is accurately corrected. Therefore, it is possible to execute the feedback correction control of the air-fuel ratio by the auxiliary air-fuel ratio detecting sensor SS for only one main air-fuel ratio detecting sensor MS1. Further, control for making the frequencies of the air-fuel ratio correction coefficients LFAF and RFAF match is simultaneously repeated. Therefore, the air-fuel ratios of the two cylinder banks are controlled to the predetermined air-fuel ratios primarily by these two processings.

In the same way, as shown in FIG. 11(B), even without the convergence of the exhaust manifolds E1 and E2 of the cylinder banks, the air-fuel ratios of the two cylinder banks are controlled to the predetermined air-fuel ratios by the same control as in the first and second embodiments.

As to other control procedures in the constructions of FIG. 11(A) and FIG. 11(B), the control for making the frequencies of the feedback correction coefficients LFAF and RFAF match may be performed for only the cylinder bank where the auxiliary air-fuel ratio detecting sensor SS is not provided. The cylinder bank where the auxiliary air-fuel ratio detecting sensor SS is disposed may be accurately corrected by the detection value of the auxiliary air-fuel ratio detecting sensor SS, so by correcting at least the cylinder bank where the auxiliary air-fuel ratio detecting sensor SS is not disposed, matching is achieved with the air-fuel ratio of the cylinder bank where the auxiliary air-fuel ratio detecting sensor SS is disposed.

In this way, there is a high degree of freedom in the disposition of the auxiliary air-fuel ratio detecting sensor SS with respect to various shapes of the exhaust manifolds E1 and E2, so there are fewer limitations on the positioning of the exhaust manifolds E1 and E2 and the degree of design freedom in internal combustion engines is improved.

Further, in the embodiments, the basic fuel injection amount TAUO was determined based on the intake air amount Q detected by the air flow meter 9 and the rotational speed Ne detected by the rotational angle sensor 49, but it is also possible to measure the intake air amount Q by a Kalman eddy sensor, hot wire sensor, etc. and to calculate the fuel injection amount TAUO based on the intake pipe pressure PM and the rotational speed NE or the throttle opening TA and rotational speed Ne.

Further, in the embodiments, use was made of air-fuel ratio detecting sensor 37, 39, and 41 of the oxygen concentration detection type, i.e., $O_2$ sensors, but use may also be made, for example, of gas sensors for detecting the carbon monoxide CO or so-called lean mixture sensors.

Further, in the embodiments, the explanation was made of an engine 1 in which the fuel injection amount was controlled by the fuel injection valves 51 and 53. However, for example, the invention may also be applied to an engine equipped with a carburetor in which the intake air amount is controlled by an air control valve (EACV), in which the air-fuel ratio is controlled by the introduction of atmospheric air into the main passage and slow passage by adjusting the bleed air of the carburetor by a bleed air control valve, and in which the amount of the secondary air supplied to the exhaust system is adjusted. In this way, in engines equipped with carburetors, the basic fuel injection amount is determined by the characteristics of the carburetor and the air-fuel ratio is controlled by calculating the amount of the air supply for achieving the desired air-fuel ratio.

While the present invention has been described with reference to specific embodiments chosen for purposes of illustration, it should be apparent that numerous modifications could be made thereto by those skilled in the art without departing from the basic concept and scope of the invention.

What is claimed:

1. An air-fuel ratio control device of an internal combustion engine having first and second cylinder banks, first and second exhaust passages connected to the first and second cylinder banks respectively, and first and second three-way catalysts disposed in the first and second exhaust passages respectively, said device comprising:
   two main air-fuel ratio detecting sensors arranged in said first and second exhaust passages upstream of said three-way catalysts respectively for detecting an air-fuel ratio in said first and second exhaust passages;
   an auxiliary air-fuel ratio detecting sensor for detecting an air-fuel ratio valve in at least the first exhaust passage of said first and second exhaust passages downstream of said three-way catalysts;
   deviation detecting means for detecting a mutual deviation between the air-fuel ratios in said first and second exhaust passages;
   first control value controlling means for controlling a control value in at least said first cylinder bank to which said first exhaust passage is connected on the basis of the value detected by said auxiliary air-fuel ratio detecting sensor;
   second control value controlling means for controlling a control value in at least said second cylinder bank on the basis of said deviation detected by said deviation detecting means to cancel said deviation;
   feedback correction coefficient controlling means for controlling the feedback correction coefficients in the cylinder banks on the basis of the values detected by said corresponding main air-fuel ratio detecting sensors and said control values; and
   air-fuel ratio control means for controlling the air-fuel ratio in said first and second exhaust passages by said corresponding feedback correction coefficients to become a predetermined air-fuel ratio.

2. An air-fuel ratio control device according to claim 1, wherein the said auxiliary air-fuel ratio detecting sensor detects the air-fuel ratio in only aid first exhaust passage.

3. An air-fuel ratio control device according to claim 2, wherein the said first and second exhaust passages are not converged.

4. An air-fuel ratio control device according to claim 2, wherein the said first and second exhaust passages are converged and the said auxiliary air-fuel ratio detecting sensor is disposed on said first exhaust passage upstream of the convergence portion.

5. An air-fuel ratio control device according to claim 1, wherein the said auxiliary air-fuel ratio detecting sensor detects the air-fuel ratio in said first exhaust passage and said second exhaust passage.

6. An air-fuel ratio control device according to claim 5, wherein the said first and second exhaust passages are converged and the said auxiliary air-fuel ratio detecting sensor is disposed in the exhaust passage downstream of the convergence portion.

7. An air-fuel ratio control device according to claim 6, wherein a catalyst is disposed upstream of said auxiliary air-fuel ratio detecting sensor in said exhaust passage downstream of the said convergence portion.

8. An air-fuel ratio control device according to claim 7, wherein all the catalysts are three-way catalysts.

9. An air-fuel ratio control device according to claim 1, wherein the said deviation detecting means determines that the air-fuel ratio is richer when the fluctuation cycles of the detection values of the main air-fuel ratio detecting sensors become shorter.

10. An air-fuel ratio control device according to claim 9, wherein the said deviation detecting means detects the fluctuation cycles of the detection values of the main air-fuel ratio detecting sensors and finds the ratio of the fluctuation cycles to thereby to detect the deviation between the air-fuel ratios.

11. An air-fuel ratio control device according to claim 9, wherein the deviation detecting means detects the deviation between the air-fuel ratios based on fluctuation cycles of a plurality of cycles of detection values of the main air-fuel ratio detecting sensors.

12. An air-fuel ratio control device according to claim 1, wherein said feedback correction coefficient control means rapidly reduces said feedback correction coefficient by a decremental skip value when a detection value of said main air-fuel ratio detecting sensors changes from a value below a first predetermined value to a value above said first predetermined value, gradually reduces said feedback correction coefficient by decremental integration constants when the detection value of said main air-fuel ratio detecting sensors is above the first predetermined value, rapidly increases said feedback correction coefficient by an incremental skip value when a detection value of said main air-fuel ratio detecting sensors changes from a value above a first predetermined value to a value below said first predetermined value, and gradually increases said feedback correction coefficient by incremental integration constants when the detection value of said main air-fuel ratio detecting sensors is below the first predetermined value, said control values being the decremental skip value, the decremental integration constant, the incremental skip value, and the incremental integration constant.

13. An air-fuel ratio control device according to claim 12, wherein said feedback correction coefficient control means reduces said feedback correction coefficient by said decremental skip value when the state of the detection value of said main air-fuel ratio detecting sensors above said first predetermined value continues for more than a predetermined time and increases said feedback correction coefficient by said incremental skip value when the state of the detection value of said main air-fuel ratio detecting sensors below said first predetermined value continues for more than a predetermined time.

14. An air-fuel ratio control device according to claim 12, wherein the said first control value controlling means increases at least one of said decremental skip value and said decremental integration constant by a predetermined first correction amount and reduces at least one of the said incremental skip value and said incremental integration constant by a predetermined second correction amount when the detection value of said auxiliary air-fuel ratio detecting sensor is above a second predetermined value and reduces at least one of said decremental skip value and said decremental integration constant by a predetermined third correction amount and reduces at least one of the said incremental skip value and said incremental integration constant by a predetermined fourth correction amount when the detection value of said auxiliary air-fuel ratio detecting sensor is below a second predetermined value.

15. An air-fuel ratio control device according to claim 14, wherein said first value is smaller than said second value.

16. An air-fuel ratio control device according to claim 14, wherein said first control value controlling means controls the respective control values corresponding to the said first cylinder bank and said second cylinder bank and said second control means controls the said first to fourth correction amounts corresponding to said second cylinder bank based on said deviation.

17. An air-fuel ratio control device according to claim 16, wherein in the case where the detection value of said auxiliary air-fuel ratio detecting sensor is smaller than said predetermined second value, the said second control value control means reduces at least the said third and fourth correction amounts corresponding to the said second cylinder bank when the said deviation detecting means judges that the air-fuel ratio in said first exhaust passage is leaner than the air-fuel ratio in said second exhaust passage and increases at least the said third and fourth correction amounts corresponding to the said second cylinder bank when the said deviation detecting means judges that the air-fuel ratio in said first exhaust passage is richer than the air-fuel ratio in said second exhaust passage and wherein in the case where the detection value of said auxiliary air-fuel ratio detecting sensor is larger than said predetermined second value, the said second control value control means increases at least the said first and second correction amounts corresponding to the said second cylinder bank when the said deviation detecting means judges that the air-fuel ratio in said first exhaust passage is leaner than the air-fuel ratio in said second exhaust passage and reduces at least the said first and second correction amounts corresponding to the said second cylinder bank when the said deviation detecting means judges that the air-fuel ratio in said first exhaust passage is richer than the air-fuel ratio in said second exhaust passage.

18. An air-fuel ratio control device according to claim 12, wherein said second control value controlling means reduces at least one of the incremental skip value and incremental integration constant corresponding to the said second cylinder bank and increases at least one of the decremental skip value and decremental integration constant corresponding to said second cylinder bank when the said deviation detecting means judges that the air-fuel ratio in said first exhaust passage is leaner than the air-fuel ratio in said second exhaust passage and increases at least one of the incremental skip value and incremental integration constant corresponding to the said second cylinder bank and reduces at least one of the decremental skip value and decremental integration constant corresponding to said second cylinder bank when the said deviation detecting means judges that the air-fuel ratio in said first exhaust passage is richer than the air-fuel ratio in said second exhaust passage.

19. An air-fuel ratio control device according to claim 18, wherein when the air-fuel ratio of said first exhaust passage is judged to be richer than the air-fuel ratio in said second exhaust passage and when the incremental skip value or incremental integration constant corresponding to the said second cylinder bank has reached a predetermined upper limit, the said second control value control means reduces at least one of the incremental skip value and incremental integration constant corresponding to the said first cylinder bank and increases at least one of the decremental skip value and decremental integration constant corresponding to said second cylinder bank.

20. An air-fuel ratio control device according to claim 18, wherein when the air-fuel ratio of said first exhaust passage is judged to be leaner than the air-fuel ratio in said second exhaust passage and when the decremental skip value or decremental integration constant corresponding to the said second cylinder bank has reached a lower limit, the said second control value control means reduces at least one of the decremental skip value and decremental integration constant corresponding to the said first cylinder bank and increases at least one of the incremental skip value and incremental integration constant corresponding to said second cylinder bank.

21. An air-fuel ratio control device according to claim 1, wherein said first control value control means controls only the control values corresponding to said first cylinder bank.

22. An air-fuel ratio control device according to claim 1, wherein said first control value controlling means controls control values corresponding to said first cylinder bank and control values corresponding to said second cylinder bank.

23. An air-fuel ratio control device according to claim 1, wherein said second control value controlling means controls only control values corresponding to the said second cylinder bank.

24. An air-fuel ratio control device according to claim 1, wherein said second control value controlling means controls control values corresponding to said first cylinder bank and control values corresponding to said second cylinder bank.

25. An air-fuel ratio control device according to claim 1, wherein said air-fuel ratio control means determines the fuel injection amount as a product of the basic fuel injection amount and the feedback correction coefficient.

* * * * *